United States Patent
Yasuda et al.

(10) Patent No.: US 6,934,226 B2
(45) Date of Patent: Aug. 23, 2005

(54) OPTICAL DISK APPARATUS

(75) Inventors: Katsuhiko Yasuda, Neyagawa (JP); Kousei Sano, Osaka (JP); Daisuke Ogata, Amagasaki (JP); Yuuichi Kuze, Settsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 321 days.

(21) Appl. No.: 10/118,583

(22) Filed: Apr. 8, 2002

(65) Prior Publication Data
US 2002/0150016 A1 Oct. 17, 2002

(30) Foreign Application Priority Data
Apr. 12, 2001 (JP) ........................ 2001-113671

(51) Int. Cl.$^7$ ................ G11B 7/00; G11B 5/09
(52) U.S. Cl. ................ 369/44.23; 369/44.29; 369/53.2; 369/112.02
(58) Field of Search ................ 369/44.27, 44.29, 369/44.35, 53.22, 53.37, 44.32, 33.19, 53.2, 44.23, 112.02, 112.23, 112.24, 94

(56) References Cited

U.S. PATENT DOCUMENTS

| | | | | |
|---|---|---|---|---|
| 5,157,555 A | * | 10/1992 | Reno | 359/823 |
| 5,901,131 A | * | 5/1999 | Ootaki et al. | 369/112.02 |
| 5,910,937 A | * | 6/1999 | Akiba et al. | 369/53.2 |
| 6,151,154 A | * | 11/2000 | Ogasawara et al. | 359/279 |
| 6,172,957 B1 | * | 1/2001 | Ogasawara | 369/94 |
| 6,292,453 B1 | | 9/2001 | Ichimura et al. | |
| 6,628,582 B2 | * | 9/2003 | Furukawa | 369/44.32 |
| 6,661,750 B2 | * | 12/2003 | Saimi et al. | 369/44.23 |
| 6,721,259 B1 | * | 4/2004 | Yamamoto et al. | 369/112.26 |
| 6,728,179 B1 | * | 4/2004 | Nakano et al. | 369/53.1 |
| 6,738,332 B2 | * | 5/2004 | Sato et al. | 369/53.28 |

FOREIGN PATENT DOCUMENTS

| | | |
|---|---|---|
| EP | 1 043 615 A1 | 10/2000 |
| JP | 10-188301 A | 7/1998 |
| JP | 2000-131603 | 5/2000 |

* cited by examiner

Primary Examiner—Thang V. Tran
(74) Attorney, Agent, or Firm—Hamre, Schumann, Mueller & Larson, P.C.

(57) ABSTRACT

The quantity of spherical aberration correction is predetermined for each recording plane of an optical disk on which focusing control is performed. Before operating the focusing control, the quantity of spherical aberration to be corrected by an aberration correcting system is set based on an output signal from an aberration correction quantity switching device that corresponds to the type of the optical disk and the recording plane to be subjected to the focusing control. This makes it possible to perform stable focusing control on each recording plane of a multi-layer optical disk with high density by using an objecting lens having a large NA after spherical aberration has been corrected properly.

24 Claims, 18 Drawing Sheets

OPTICAL DISK APPARATUS

BACKGROUND OF THE INVENTION

1. Field of the Invention

The present invention relates to an optical disk apparatus for recording, reproducing or erasing information on an optical disk that acts as an optical information medium.

2. Description of the Related Art

The optical storage technology that employs a optical disk with pit patterns as a high-density, large-capacity recording medium has been put into practical use while expanding its applications to digital versatile disks (DVD), video disks, document file disks, and data files. The functions required for recording/reproducing information successfully and with high reliability on an optical disk by a finely focused light beam (e.g., with a diameter of 1 µm or less) are classified into three major categories: a focusing function for forming a diffraction-limited tiny spot, focusing control (focus servo) and tracking control functions of an optical system, and a pit signal (information signal) detecting function.

To improve the recording density of an optical disk further, an increase in the numerical aperture (NA) of an objective lens has been studied recently. The objective lens focuses a light beam on the optical disk to form a diffraction-limited tiny spot. However, spherical aberration, which is caused by an error in thickness of a base material for protecting a recording layer of the optical disk, is proportional to the fourth power of NA. Therefore, when NA is increased, e.g., to 0.8 or 0.85, the spherical aberration becomes significantly large. Thus, a means for correcting the spherical aberration is essential to the optical system. FIG. 13 shows an example of such an optical system.

Referring to an optical pickup 11 in FIG. 13, numeral 1 denotes a radiation source such as a laser source. A light beam 20 (a laser beam) emitted from the laser source 1 is converted into parallel light by a collimator lens 3, passes through a liquid crystal aberration correcting element 4, and enters an objective lens 5 to be focused onto an information recording plane of an optical disk 6. The light beam reflected from the optical disk 6 retraces the same optical path so as to be condensed by the collimator lens 3 and is directed into photodetectors 9, 10 by a light separating device such as a diffraction element 2. Servo signals (i.e., a focus error signal and a tracking error signal) and information signals are generated from output signals of the photodetectors 9, 10. Here, the NA of the objective lens 5 is as large as 0.8 or more. An actuator 7 includes a driving means, such as coils and magnets, and performs focusing control for positioning the objective lens 5 in the direction parallel to an optical axis and tracking control for positioning it in the direction perpendicular to the optical axis.

A transparent base material (not shown) is formed on the information recording plane of the optical disk 6 on the side of the objective lens 5 and serves to protect information. Since differences in thickness and refractive index of the transparent base material cause spherical aberration, the liquid crystal aberration correcting element 4 corrects a wavefront of the light beam to provide optimum reproduction signals. The liquid crystal aberration correcting element 4 has a transparent electrode pattern made of indium-tin-oxide (ITO) alloy or the like. The in-plane refractive index distribution of the liquid crystal aberration correcting element 4 is controlled by applying a voltage to the transparent electrode so as to modulate the wavefront of the light beam.

FIG. 14 shows an optical disk apparatus 116. Referring to FIG. 14, numeral 8 denotes an aberration correcting element driving circuit 8 that applies a voltage to the liquid crystal aberration correcting element 4, and 118 denotes a control circuit that receives a signal from the optical pickup 11 and controls and drives the actuator 7, the aberration correcting element driving circuit 8, and the laser source 1. The control circuit 118 causes the laser source 1 to emit a light beam and controls the position of the objective lens 5 based on the signal from the optical pickup 11. Moreover, it drives the aberration correcting element driving circuit 8 to improve information signals from the optical pickup 11.

In addition to the above example, JP 2000-131603 A also discloses an optical system for the optical pickup 11, which is illustrated in FIG. 15.

FIG. 15 shows the components of the optical system other than a laser source, a collimator lens, and a photodetector. A light beam that has been converted into parallel light by a collimator lens passes through an aberration correcting lens group 201 and is focused on an optical disk 6 by an objective lens group 202. The aberration correcting lens group 201 includes a negative lens group 21 and a positive lens group 22. The objective lens group includes an objective lens 302 and a forward lens 301. The space between the negative and positive lens groups 21, 22 is changed to correct spherical aberration in the entire optical system. To change the space between the two lens groups, e.g., a driving portion 25 that shifts the negative lens group 21 in the optical axis direction can be used. The driving portion 25 may be formed, e.g., of a voice coil, a piezoelectric element, an ultrasonic motor, a screw feeder, or the like.

In the above configuration, spherical aberration is corrected so as to improve the quality of information signals on the assumption that the optical disk 6 has a single information recording plane and focusing control is performed stably on the information recording plane. For the DVD standard that uses an objective lens having an NA of 0.6, a two-layer disk with two information recording planes is employed. Therefore, the two-layer disk structure as well as a larger NA is effective in increasing recording capacity per optical disk.

As shown in FIG. 16, two-layer disk 6 includes a base material 62, an L0 layer (a first recording layer) 63, an intermediate layer 65, an L1 layer (a second recording layer) 64, and a protective layer 66 to form the back of the optical disk, which are stacked in this order from the optical pickup side. The base material 62 and the intermediate layer 65 are transparent media of resin or the like. Since the intermediate layer 65 is between the L0 layer 63 and the L1 layer 64, the thickness measured from the surface 61 of the optical disk 6 on the optical pickup side to the second recording layer (L1 layer) 64 is larger than that to the first recording layer (L0 layer) 63 by the thickness of the intermediate layer 65. Such a difference in thickness causes spherical aberration. However, the magnitude of the spherical aberration can be tolerated by the optical system of the DVD standard that includes an objective lens having an NA of 0.6. Therefore, it is possible to record/reproduce information without correcting the spherical aberration.

When NA is increased to 0.8 or more so as to achieve a further improvement in the recording density of an optical disk, spherical aberration caused by the thickness of the intermediate layer 65 cannot be ignored. In other words, the correction of spherical aberration is indispensable for recording/reproducing information on both of the recording layers. As described above, increasing NA to 0.8 or more requires a means for correcting spherical aberration even if information is recorded/reproduced on a single recording layer. Thus, as a matter of course, it is necessary to correct spherical aberration optimally at each of the recording layers when information is recorded/reproduced on a two-layer disk as shown in FIG. 16. This can eliminate the spherical aberration caused by the thickness of the intermediate layer.

JP 10(1998)-188301 A discloses the correction of spherical aberration that is performed before operating focusing control on an information recording plane. FIG. 17 shows this configuration. An objective lens 302 is held by a holder 305, and a forward lens 301 is held on the holder 305 via a second drive means 304. Therefore, a first drive means 303 that supports the holder 305 drives both of the forward lens 301 and the objective lens 302 in a focusing direction. The second drive means 304 drives the forward lens 301 relative to the objective lens 302 in the focusing direction. The space between the forward lens 301 and the objective lens 302 can be changed by driving the forward lens 301 in the focusing direction with the second drive means 304, thus correcting spherical aberration.

In this configuration, the first drive means 303 drives the forward lens 301 and the objective lens 302 together in the focusing direction. Therefore, these lenses are prone to deviate from the center and tilt, which makes it difficult to satisfy the strict tolerance of positioning accuracy for the lenses 301, 302.

Next, the problems of the aberration correcting lens group including two lens groups, i.e., the positive lens group and the negative lens group, will be described. FIGS. 18A and 18B are schematic views showing the aberration correcting lens groups located with their optical axes extending in a horizontal direction and in a vertical direction, respectively.

The aberration correcting lens group 201 located with its optical axis 201a horizontal is explained by referring to FIG. 18A. As shown in FIG. 18A, the positive lens group 22 is fixed and held by a stationary portion 26, while the negative lens group 21 is held by a lens holder 24. The lens holder 24 is held by the stationary portion 26 via a plurality of elastic wires 27. Therefore, the negative lens group 21 is held by the stationary portion 26 in a cantilever supporting fashion. A driving portion (not shown) that shifts the negative lens group 21 held by the lens holder 24 in the direction of the optical axis 201a is provided to change the space between the positive and negative lens groups 22, 21, thus correcting spherical aberration.

When the aberration correcting lens group 201 is located with its optical axis 201a horizontal, there is no problem because the negative lens group 21 is at the position Y0 in the direction of the optical axis 201a as designed, and the space between the positive and negative lens groups 22, 21 also is kept at a designed value A.

Depending on the orientation of an optical disk apparatus or the design of an optical pickup, the aberration correcting lens group 201 may be located with its optical axis 201a vertical. This configuration is explained by referring to FIG. 18B. As shown in FIG. 18B, the position of the negative lens group 21 in the direction of the optical axis 201a is shifted to Y1 due to the gravitational displacement of the negative lens group 21 and the lens holder 24. The position Y1 deviates from the position Y0, which is not affected by the gravitation displacement of the negative lens group 21 and the lens holder 24, by a distance α in the direction of the optical axis 201a. Therefore, the space between the positive and negative lens groups 22,21 is A+α.

As described above, when spherical aberration is corrected by changing the space between two lens groups, there is a problem that spherical aberration is caused in the initial state due to a positional deviation α resulting from the gravitational displacement that depends on the orientation of the apparatus.

SUMMARY OF THE INVENTION

Therefore, with the foregoing in mind, it is an object of the present invention to provide an optical disk apparatus that can obtain a favorable focus error signal and thus perform stable focusing control, the apparatus including an objective lens with a high numerical aperture (preferably, 0.8 or more) to increase the recording density of an optical disk and a device for correcting spherical aberration other than the objective lens used in focusing control, and correcting spherical aberration for a recording plane to be subjected to focusing control before operating the focusing control.

To achieve the above object, an optical disk apparatus of the present invention has the following configuration.

A first optical disk apparatus of the present invention includes the following: an optical pickup that includes a laser source, a focusing optical system for receiving a light beam emitted from the laser source and focusing the light beam on an optical disk to form a tiny spot, a transfer system for transferring the focusing optical system in the direction substantially perpendicular to the optical disk, a photodetector for receiving light reflected from the optical disk and outputting an electric signal in accordance with the quantity of light, and an aberration correcting system for correcting the spherical aberration of the focusing optical system; a focusing error detection device for detecting a focused state of the tiny spot on the optical disk based on the output signal from the photodetector; a focusing control device for controlling the focused state of the tiny spot on the optical disk so as to be a predetermined state by driving the transfer system based on an output signal from the focusing error detection device; a disk discrimination device for discriminating the type of the optical disk; and an aberration correction quantity switching device for switching a quantity of spherical aberration correction of the aberration correcting system selectively based on a signal from the disk discrimination device. The aberration correcting system includes a liquid crystal element. The quantity of spherical aberration correction of the aberration correcting system is preset based on an output signal from the aberration correction quantity switching device before operating the focusing control device.

In the first optical disk apparatus, it is preferable that the quantity of spherical aberration correction of the aberration correcting system is determined based on a standard thickness of an intermediate layer of a two-layer disk.

A second optical disk apparatus of the present invention includes the following: an optical pickup that includes a laser source, a focusing optical system for receiving a light beam emitted from the laser source and focusing the light beam on an optical disk to form a tiny spot, a transfer system for transferring the focusing optical system in the direction substantially perpendicular to the optical disk, a photodetector for receiving light reflected from the optical disk and outputting an electric signal in accordance with the quantity of light, and an aberration correcting system for correcting the spherical aberration of the focusing optical system; a focusing error detection device for detecting a focused state of the tiny spot on the optical disk based on the output signal from the photodetector; a focusing control device for controlling the focused state of the tiny spot on the optical disk so as to be a predetermined state by driving the transfer system based on an output signal from the focusing error detection device; and a reference value storage device for storing a quantity of spherical aberration correction of the aberration correcting system obtained when spherical aberration is optimized for an optical disk having a reference thickness. The aberration correcting system includes a liquid crystal element. The quantity of spherical aberration correction of the aberration correcting system is preset based on an output signal from the reference value storage device before operating the focusing control device.

A third optical disk apparatus of the present invention includes the following: an optical pickup that includes a laser source, a focusing optical system for receiving a light beam emitted from the laser source and focusing the light beam on an optical disk to form a tiny spot, a transfer system for transferring the focusing optical system in the direction substantially perpendicular to the optical disk, a photodetector for receiving light reflected from the optical disk and outputting an electric signal in accordance with the quantity of light, and an aberration correcting system for correcting the spherical aberration of the focusing optical system; a focusing error detection device for detecting a focused state of the tiny spot on the optical disk based on the output signal from the photodetector; a focusing control device for controlling the focused state of the tiny spot on the optical disk so as to be a predetermined state by driving the transfer system based on an output signal from the focusing error detection device; a disk discrimination device for discriminating the type of the optical disk; an aberration correction quantity switching device for switching a first quantity of spherical aberration correction of the aberration correcting system selectively based on a signal from the disk discrimination device; a reference value storage device for storing a second quantity of spherical aberration correction of the aberration correcting system obtained when spherical aberration is optimized for an optical disk having a reference thickness; and an adder for adding the first and second quantities of spherical aberration correction. The aberration correcting system includes a liquid crystal element. A quantity of spherical aberration correction of the aberration correcting system is preset based on an output signal from the adder before operating the focusing control device.

A fourth optical disk apparatus of the present invention includes the following: an optical pickup that includes a laser source, a focusing optical system for receiving a light beam emitted from the laser source and focusing the light beam on an optical disk to form a tiny spot, a transfer system for transferring the focusing optical system in the direction substantially perpendicular to the optical disk, a photodetector for receiving light reflected from the optical disk and outputting an electric signal in accordance with the quantity of light, and an aberration correcting system for correcting the spherical aberration of the focusing optical system; a focusing error detection device for detecting a focused state of the tiny spot on the optical disk based on the output signal from the photodetector; and a focusing control device for controlling the focused state of the tiny spot on the optical disk so as to be a predetermined state by driving the transfer system based on an output signal from the focusing error detection device. The aberration correcting system includes a liquid crystal element. A learning operation for spherical aberration correction quantity is performed before operating the focusing control device. The learning operation includes the steps of obtaining a first amplitude of the output signal from the focusing error detection device, storing the first amplitude, obtaining a second amplitude of the output signal from the focusing error detection device after changing a quantity of spherical aberration correction of the aberration correcting system, and comparing the first amplitude with the second amplitude.

A fifth optical disk apparatus of the present invention includes the following: an optical pickup that includes a laser source, a focusing optical system for receiving a light beam emitted from the laser source and focusing the light beam on an optical disk to form a tiny spot, a transfer system for transferring the focusing optical system in the direction substantially perpendicular to the optical disk, a photodetector for receiving light reflected from the optical disk and outputting an electric signal in accordance with the quantity of light, and an aberration correcting system for correcting the spherical aberration of the focusing optical system; a focusing error detection device for detecting a focused state of the tiny spot on the optical disk based on the output signal from the photodetector; and a focusing control device for controlling the focused state of the tiny spot on the optical disk so as to be a predetermined state by driving the transfer system based on an output signal from the focusing error detection device. The aberration correcting system includes a liquid crystal element. A learning operation for spherical aberration correction quantity is performed before operating the focusing control device. The learning operation includes the steps of obtaining a first amplitude of a reproduction signal, storing the first amplitude, obtaining a second amplitude of the reproduction signal after changing a quantity of spherical aberration correction of the aberration correcting system, and comparing the first amplitude with the second amplitude.

In the fourth and fifth optical disk apparatuses, it is preferable that the learning operation is performed on every recording layer of the optical disk at the time the optical disk is installed in the optical disk apparatus or the time the apparatus is turned on.

A sixth optical disk apparatus of the present invention includes the following: an optical pickup that includes a laser source, a focusing optical system for receiving a light beam emitted from the laser source and focusing the light beam on an optical disk to form a tiny spot, a first transfer system for transferring the focusing optical system in the direction substantially perpendicular to the optical disk, a photodetector for receiving light reflected from the optical disk and outputting an electric signal in accordance with the quantity of light, and an aberration correcting system for correcting the spherical aberration of the focusing optical system; a focusing error detection device for detecting a focused state of the tiny spot on the optical disk based on the output signal from the photodetector; a focusing control device for controlling the focused state of the tiny spot on the optical disk so as to be a predetermined state by driving the first transfer system based on an output signal from the focusing error detection device; a disk discrimination device for discriminating the type of the optical disk; and an aberration correction quantity switching device for switching a quantity of spherical aberration correction of the aberration correcting system selectively based on a signal from the disk discrimination device. The aberration correcting system includes a first lens group and a second lens group that are arranged between the laser source and the focusing optical system, and a second transfer system for changing the space between the first and second lens groups by shifting one of the first and second lens groups in the optical axis direction. The quantity of spherical aberration correction of the aberration correcting system is preset based on an output signal from the aberration correction quantity switching device before operating the focusing control device.

In the sixth optical disk apparatus, it is preferable that the quantity of spherical aberration correction of the aberration correcting system is determined based on a standard thickness of an intermediate layer of a two-layer disk.

A seventh optical disk apparatus of the present invention includes the following: an optical pickup that includes a laser source, a focusing optical system for receiving a light beam emitted from the laser source and focusing the light beam on an optical disk to form a tiny spot, a first transfer system for transferring the focusing optical system in the direction substantially perpendicular to the optical disk, a photodetector for receiving light reflected from the optical disk and outputting an electric signal in accordance with the quantity of light, and an aberration correcting system for correcting the spherical aberration of the focusing optical system; a focusing error detection device for detecting a focused state of the tiny spot on the optical disk based on the output signal from the photodetector; a focusing control device for controlling the focused state of the tiny spot on the optical disk so as to be a predetermined state by driving the first transfer system based on an output signal from the focusing error detection device; and a reference value storage device for storing a quantity of spherical aberration correction of the aberration correcting system obtained when spherical aberration is optimized for an optical disk having a reference thickness. The aberration correcting system includes a first lens group and a second lens group that are arranged between the laser source and the focusing optical system, and a second transfer system for changing the space between the first and second lens groups by shifting one of the first and second lens groups in the optical axis direction. The quantity of spherical aberration correction of the aberration correcting system is preset based on an output signal from the reference value storage device before operating the focusing control device.

An eighth optical disk apparatus of the present invention includes the following: an optical pickup that includes a laser source, a focusing optical system for receiving a light beam emitted from the laser source and focusing the light beam on an optical disk to form a tiny spot, a first transfer system for transferring the focusing optical system in the direction substantially perpendicular to the optical disk, a photodetector for receiving light reflected from the optical disk and outputting an electric signal in accordance with the quantity of light, and an aberration correcting system for correcting the spherical aberration of the focusing optical system; a focusing error detection device for detecting a focused state of the tiny spot on the optical disk based on the output signal from the photodetector; a focusing control device for controlling the focused state of the tiny spot on the optical disk so as to be a predetermined state by driving the first transfer system based on an output signal from the focusing error detection device; a disk discrimination device for discriminating the type of the optical disk; an aberration correction quantity switching device for switching a first quantity of spherical aberration correction of the aberration correcting system selectively based on a signal from the disk discrimination device; a reference value storage device for storing a second quantity of spherical aberration correction of the aberration correcting system obtained when spherical aberration is optimized for an optical disk having a reference thickness; and an adder for adding the first and second quantities of spherical aberration correction. The aberration correcting system includes a first lens group and a second lens group that are arranged between the laser source and the focusing optical system, and a second transfer system for changing the space between the first and second lens groups by shifting one of the first and second lens groups in the optical axis direction. A quantity of spherical aberration correction of the aberration correcting system is preset based on an output signal from the adder before operating the focusing control device.

In the seventh and eighth optical disk apparatuses, it is preferable that the apparatuses further include a device for storing a quantity of gravitational displacement correction used to correct the space between the first and second lens groups.

A ninth optical disk apparatus of the present invention includes the following: an optical pickup that includes a laser source, a focusing optical system for receiving a light beam emitted from the laser source and focusing the light beam on an optical disk to form a tiny spot, a first transfer system for transferring the focusing optical system in the direction substantially perpendicular to the optical disk, a photodetector for receiving light reflected from the optical disk and outputting an electric signal in accordance with the quantity of light, and an aberration correcting system for correcting the spherical aberration of the focusing optical system; a focusing error detection device for detecting a focused state of the tiny spot on the optical disk based on the output signal from the photodetector; and a focusing control device for controlling the focused state of the tiny spot on the optical disk so as to be a predetermined state by driving the first transfer system based on an output signal from the focusing error detection device. The aberration correcting system includes a first lens group and a second lens group that are arranged between the laser source and the focusing optical system, and a second transfer system for changing the space between the first and second lens groups by shifting one of the first and second lens groups in the optical axis direction. A learning operation for spherical aberration correction quantity is performed before operating the focusing control device. The learning operation includes the steps of obtaining a first amplitude of the output signal from the focusing error detection device, storing the first amplitude, obtaining a second amplitude of the output signal from the focusing error detection device after changing a quantity of spherical aberration correction of the aberration correcting system, and comparing the first amplitude with the second amplitude.

A tenth optical disk apparatus of the present invention includes the following: an optical pickup that includes a laser source, a focusing optical system for receiving a light beam emitted from the laser source and focusing the light beam on an optical disk to form a tiny spot, a first transfer system for transferring the focusing optical system in the direction substantially perpendicular to the optical disk, a photodetector for receiving light reflected from the optical disk and outputting an electric signal in accordance with the quantity of light, and an aberration correcting system for correcting the spherical aberration of the focusing optical system; a focusing error detection device for detecting a focused state of the tiny spot on the optical disk based on the output signal from the photodetector; and a focusing control device for controlling the focused state of the tiny spot on the optical disk so as to be a predetermined state by driving the first transfer system based on an output signal from the focusing error detection device. The aberration correcting system includes a first lens group and a second lens group that are arranged between the laser source and the focusing optical system, and a second transfer system for changing the space between the first and second lens groups by shifting one of the first and second lens groups in the optical axis direction. A learning operation for spherical aberration correction quantity is performed before operating the focusing control device. The learning operation includes the steps of obtaining a first amplitude of a reproduction signal, storing the first amplitude, obtaining a second amplitude of the reproduction signal after changing a quantity of spherical aberration correction of the aberration correcting system, and comparing the first amplitude with the second amplitude.

In the ninth and tenth optical disk apparatuses, it is preferable that the learning operation is performed on every recording layer of the optical disk at the time the optical disk is installed in the optical disk apparatus or the time the apparatus is turned on.

In the sixth to tenth optical disk apparatuses, it is preferable that the first transfer system and the aberration correcting system are located at different positions on the optical pickup.

According to the first to tenth optical disk apparatuses, a suitable correction of spherical aberration for the recording plane of an optical disk that is subjected to focusing control is performed before operating the focusing control device. Therefore, even when information is recorded/reproduced on a high-density optical disk with an objective lens having a large NA, a favorable focus error signal can be provided, resulting in stable operation of the focusing control.

There are some cases in which spherical aberration varies with each optical pickup due to adjustment errors of the focusing optical system itself or the entire optical system. In the second, third, seventh and eighth optical disk apparatuses, the quantity of correction required to correct the spherical aberration inherent in each optical pickup is stored in the reference value storage device. Thus, the spherical aberration is corrected before operating the focusing control device while considering the spherical aberration inherent in each optical pickup. Therefore, a favorable focus error signal can be provided, resulting in stable operation of focusing control. Consequently, the accuracy regarding the components and assembly of optical pickups can be relaxed, which leads to an enhancement in mass-production of the optical pickups and also to a reduction in cost.

In the fourth, fifth, ninth and tenth optical disk apparatuses, the learning operation for spherical aberration correction quantity is performed before operating the focusing control device. Therefore, even when an optical disk has non-uniform thickness and when spherical aberration varies with each optical pickup due to adjustment errors of the focusing optical system itself or the entire optical system, the optimum quantity of spherical aberration correction can be obtained to reduce the spherical aberration. Thus, even if there are a thickness error of the optical disk and spherical aberration inherent in the optical pickup, a favorable focus error signal always can be provided, resulting in stable operation of focusing control. Consequently, the accuracy regarding the components and assembly of optical pickups can be relaxed, which leads to an enhancement in mass-production of the optical pickups and also to a reduction in cost.

The use of the gravitational displacement correction quantity storage device makes it possible to correct a change in the space between the first lens group and the second lens group, even if the aberration correcting lens group is located with its optical axis vertical. Thus, spherical aberration caused by the gravitational displacement of the first or the second lens group is corrected before operating the focusing control device. Therefore, a favorable focus error signal can be always provided, regardless of the orientation of the optical disk apparatus, resulting in stable operation of focusing control.

BRIEF DESCRIPTION OF THE DRAWINGS

FIG. 7A shows the focus error signal before correcting spherical aberration; FIG. 7B shows the focus error signal after correcting spherical aberration.

DESCRIPTION OF THE PREFERRED EMBODIMENTS

Figure 1:
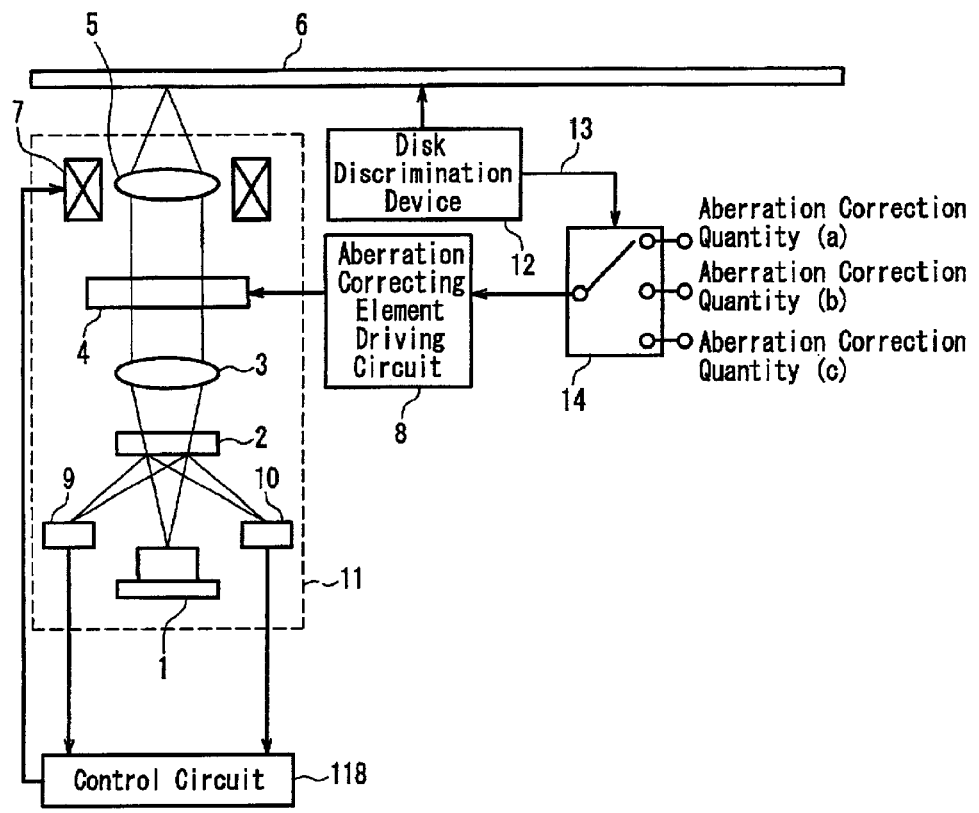
FIG. 1 is a schematic cross-sectional view of an optical disk apparatus according to Embodiment 1 of the present invention.

Hereinafter, specific embodiments of an optical disk apparatus of the present invention will be described in detail by referring to the drawings.

Embodiment 1

FIG. 1 shows the configuration of an optical disk apparatus according to Embodiment 1 of the present invention. The optical disk apparatus of this embodiment includes an optical pickup 11, an aberration correcting element driving circuit 8, a control circuit 118, a disk discrimination device 12, and an aberration correction quantity switching device 14. The optical pickup 11 is the same as that shown in FIG. 13, which has been explained in the conventional example. The aberration correcting element driving circuit 8 drives a liquid crystal aberration correcting element (an aberration correcting system) 4. The control circuit 118 receives a signal from the optical pickup 11 and drives an objective lens 5. The disk discrimination device 12 discriminates the type of an optical disk. The aberration correction quantity switching device 14 selects and switches the quantity of spherical aberration to be corrected by the liquid crystal aberration correcting element 4 based on a disk discrimination signal 13 output from the disk discrimination device 12.

Figure 13:
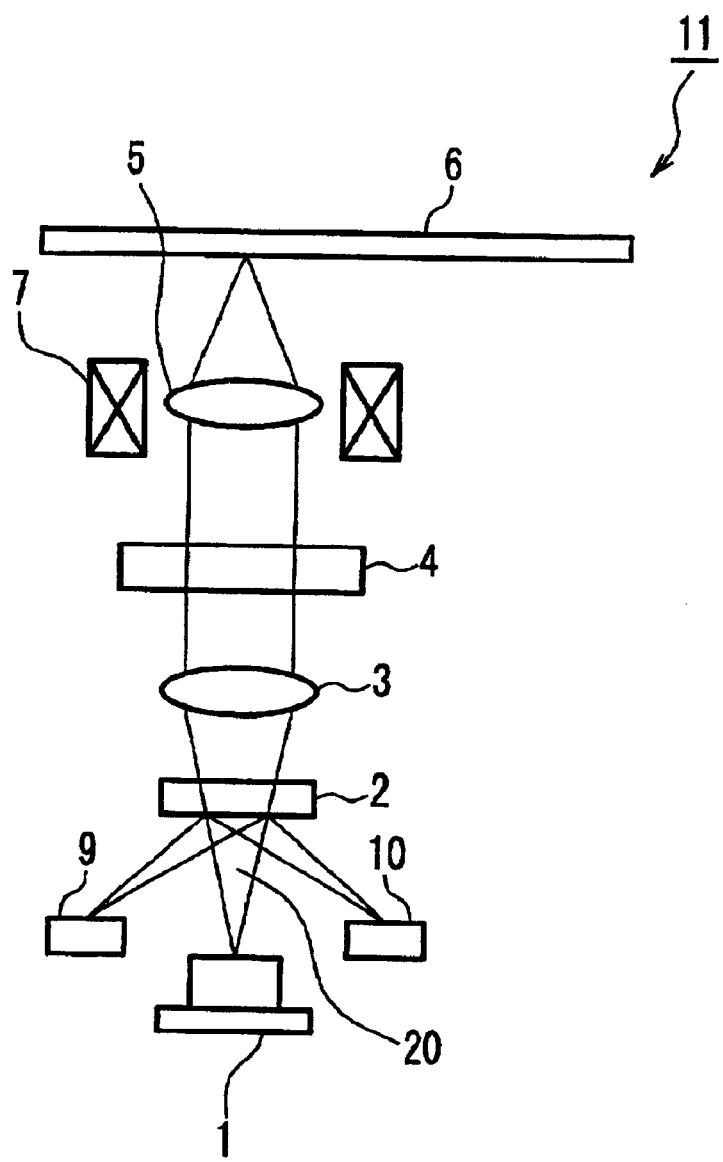
FIG. 13 is a schematic cross-sectional view of an optical pickup used in the embodiments of the present invention and in a conventional example.
Figure 14:
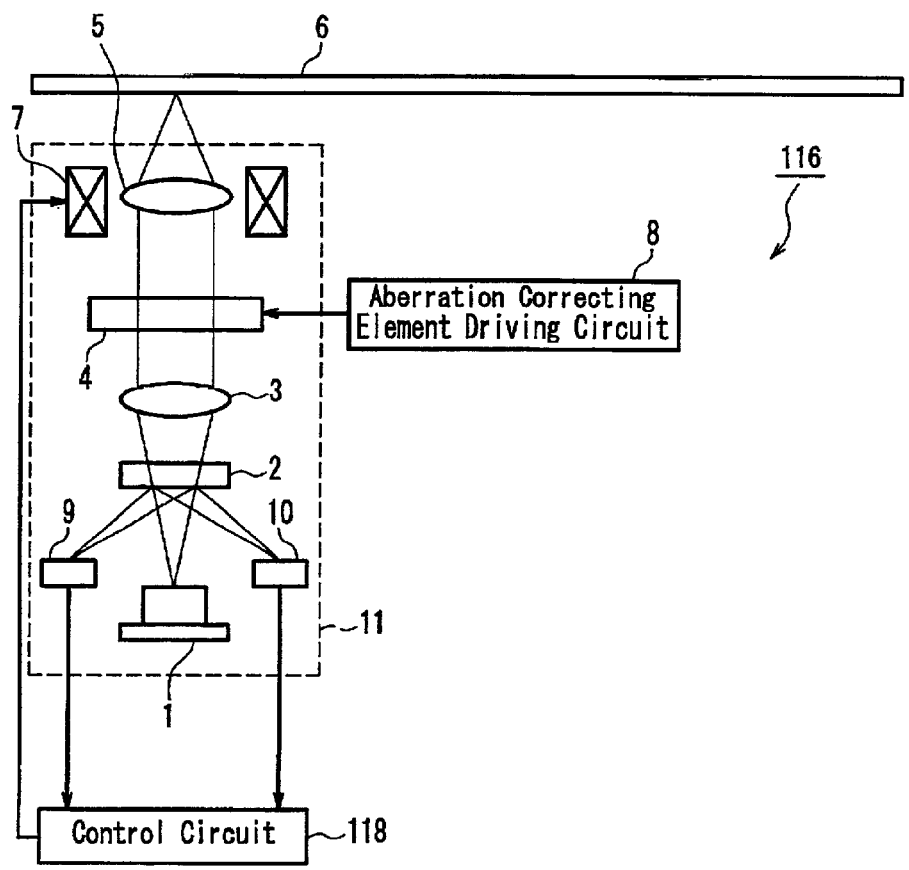
FIG. 14 is a schematic cross-sectional view of a conventional optical disk apparatus.
Figure 15:
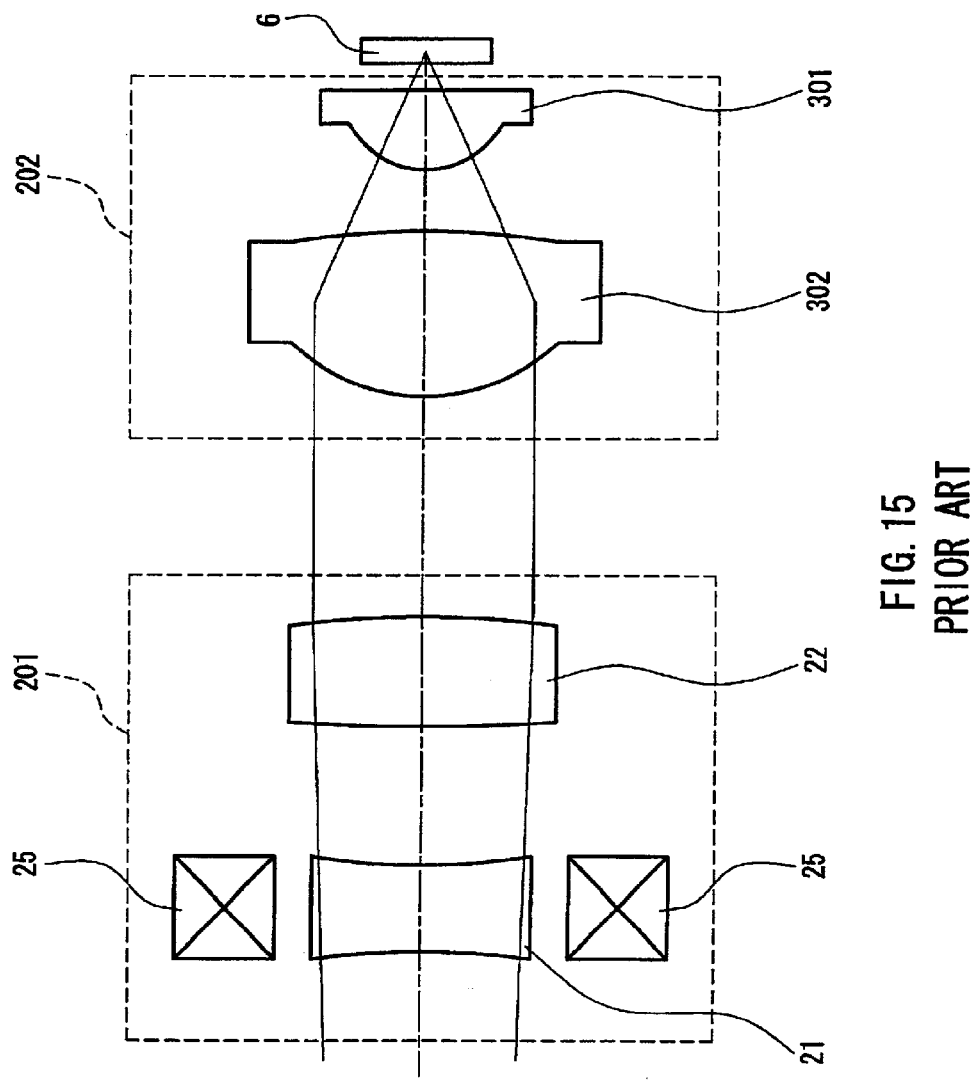
FIG. 15 is a schematic cross-sectional view of the main portions of an optical pickup used in the embodiments of the present invention and in a conventional example.
Figure 16:
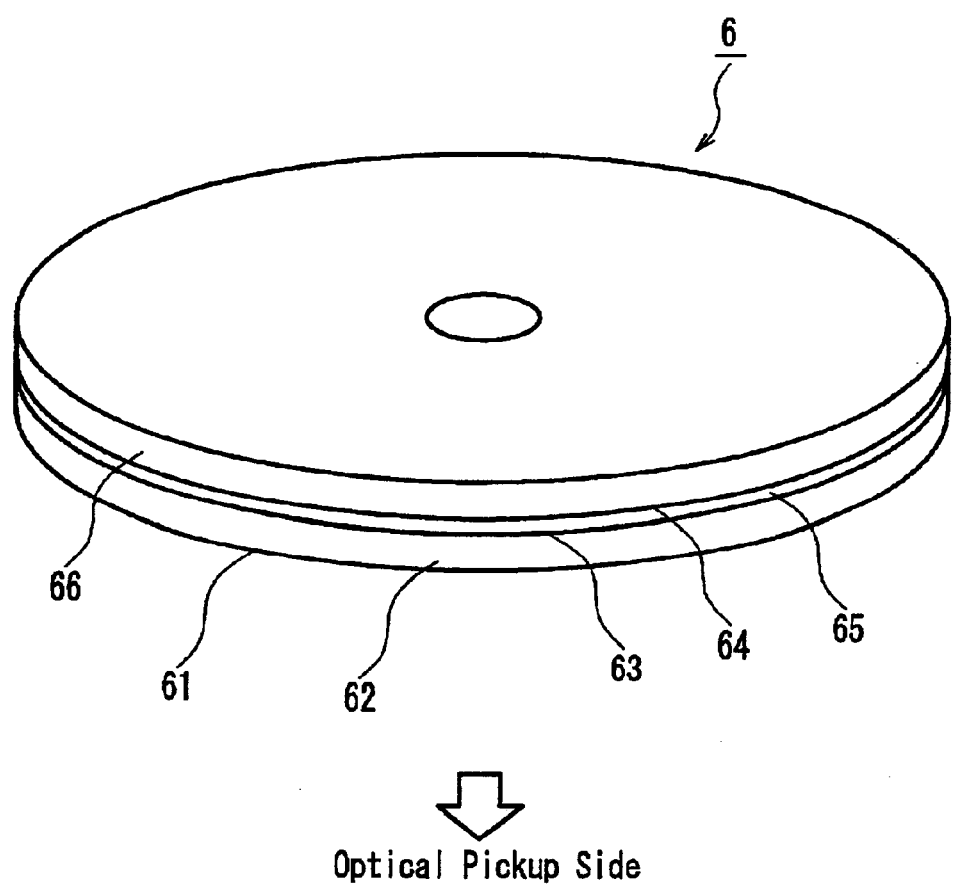
FIG. 16 is a schematic perspective view of a conventional multi-layer optical disk.
Figure 17:
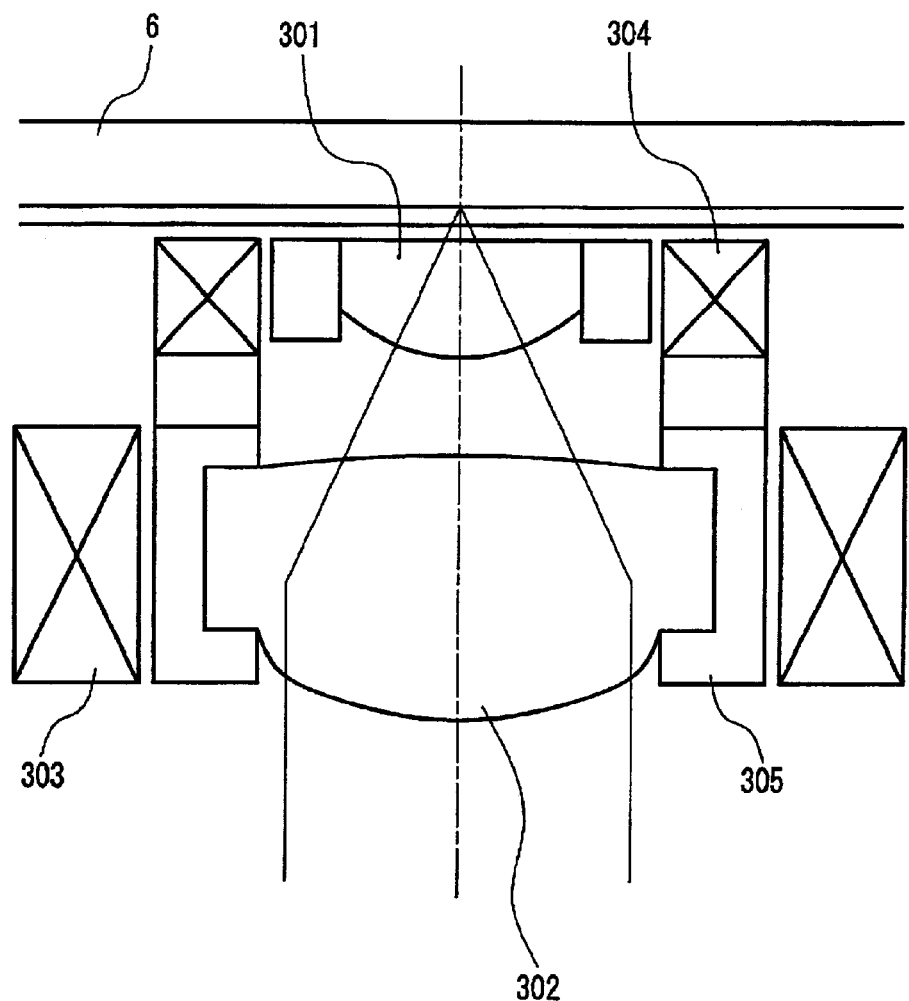
FIG. 17 is a schematic cross-sectional view of the main portions of a conventional optical pickup.

Since the optical pickup 11 has the same configuration as that shown in FIG. 13, the identical elements to those in FIG. 13 are denoted by the same reference numerals and the detailed description will be omitted.

The following is an explanation of the aberration correction quantity switching device 14. For example, the base material thickness of a reference disk is 100 μm. The aberration correction quantity switching device 14 has three predetermined aberration correction quantities: (a) a quantity of spherical aberration correction of 0 mλ; (b) a quantity of spherical aberration correction for an optical disk whose base material thickness is 10 μm thinner than that of the reference disk; and (c) a quantity of spherical aberration correction for an optical disk whose base material thickness is 10 μm thicker than that of the reference disk. The aberration correction quantity switching device 14 selects and switches an appropriate quantity for correcting spherical aberration among the three quantities in accordance with the disk discrimination signal 13 from the disk discrimination device 12.

Figure 2A:
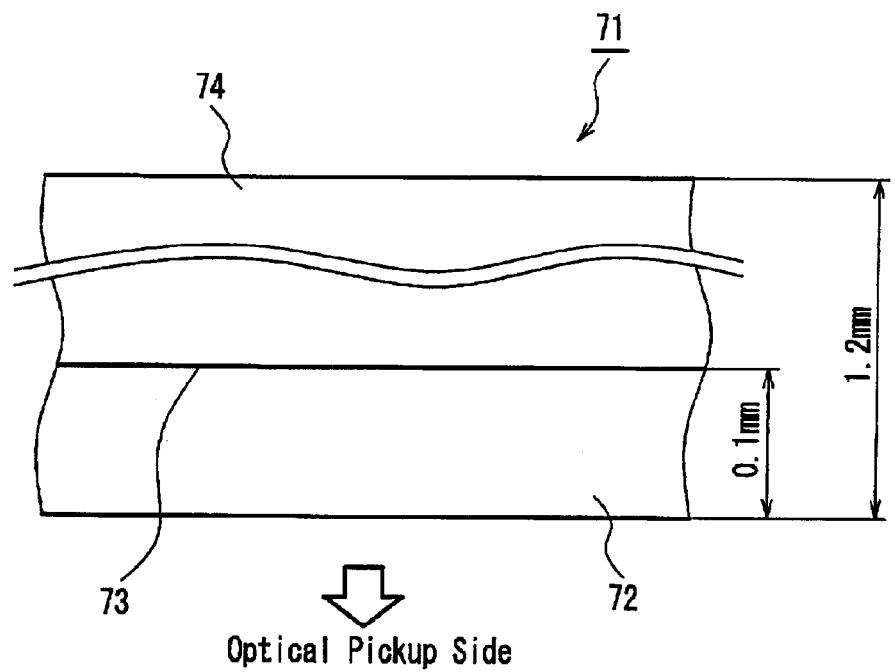
FIG. 2A is a schematic cross-sectional view of a single-layer disk.
Figure 2B:
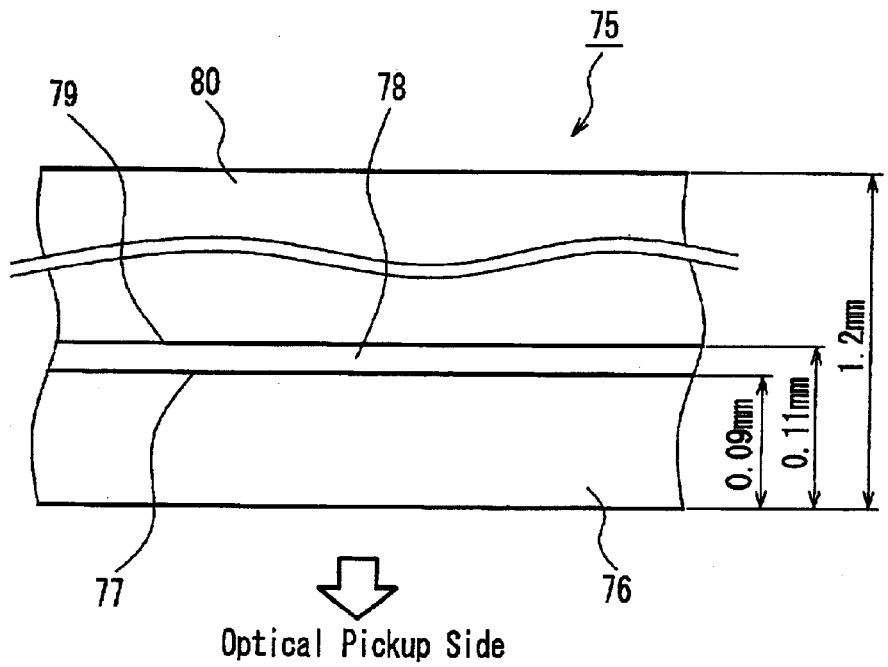
FIG. 2B is a schematic cross-sectional view of a two-layer disk.

FIGS. 2A and 2B are cross-sectional views showing examples of the configurations of optical disks: FIG. 2A illustrates a first optical disk (single-layer disk) 71 with a single recording layer, and FIG. 2B illustrates a second optical disk (two-layer disk) 75 with two recording layers.

The first optical disk 71 in FIG. 2A includes a base material 72, a recording layer 73 and a protective layer 74 to form the back of the optical disk, which are stacked in this order from the optical pickup side. The base material 72 is made of a transparent material such as resin or the like. The thickness from the surface of the first optical disk 71 on the optical pickup side to the recording layer is 0.1 mm.

The second optical disk 75 in FIG. 2B includes a base material 76, an L0 layer (first recording layer) 77, an intermediate layer 78, an L1 layer (second recording layer) 79, and a protective layer 80 to form the back of the optical disk, which are stacked in this order from the optical pickup side. The base material 76 and the intermediate layer 78 are made of a transparent material such as resin or the like. The thicknesses from the surface of the second optical disk 75 on the optical pickup side to the L0 layer and to the L1 layer are 0.09 mm and 0.11 mm, respectively.

Next, the procedure for correcting spherical aberration of this embodiment will be described. The spherical aberration correcting operation can start when, e.g., an optical disk is installed in the optical disk apparatus or the apparatus is turned on. First, the disk discrimination device 12 discriminates the type of the optical disk. When it turns out that the optical disk has a single recording layer (the first optical disk 71), the aberration correction quantity switching device 14 selects the aberration correction quantity (a) according to the instructions of the disk discrimination signal 13. Thus, the liquid crystal aberration correcting element 4 corrects a spherical aberration that corresponds to a base material thickness error of 0 μm relative to the reference disk. Consequently, a stable focus error signal can be provided in focusing control that is performed on the recording layer after the correction.

Next, the correction of spherical aberration for a two-layer disk will be described.

When the optical disk having two recording layers (the second optical disk 75) is discriminated by the disk discrimination device 12 and focusing control is performed on the L0 layer 77, the aberration correction quantity switching device 14 selects the aberration correction quantity (b) according to the instructions of the disk discrimination signal 13. Thus, the liquid crystal aberration correcting element 4 corrects a spherical aberration that corresponds to a base material thickness error of 10 μm by which the base material of the optical disk is thinner than that of the reference disk. Consequently, a stable focus error signal can be provided in focusing control that is performed on the L0 layer 77 after the correction.

Similarly, when the optical disk having two recording layers (the second optical disk 75) is discriminated by the disk discrimination device 12 and focusing control is performed on the L1 layer 79, the aberration correction quantity switching device 14 selects the aberration correction quantity (c) according to the instructions of the disk discrimination signal 13. Thus, the liquid crystal aberration correcting element 4 corrects a spherical aberration that corresponds to a base material thickness error of 10 μm by which the base material of the optical disk is thicker than that of the reference disk. Consequently, a stable focus error signal can be provided in focusing control that is performed on the L1 layer 79 after the correction.

In an optical disk apparatus of this embodiment, the correction of spherical aberration for the recording plane of an optical disk that is subjected to focusing control is performed before operating the focusing control. Thus, a favorable focus error signal can be provided in the subsequent focusing control, so that the effect of operating stable focusing control can be achieved.

This embodiment starts the correction of spherical aberration before operating focusing control. The quantity of spherical aberration correction is predetermined for each recording plane of an optical disk that is subjected to focusing control, among which an appropriate quantity is selected and switched in accordance with the type of the disk and the target recording plane. In this embodiment, it is estimated that the quantity of correction to be selected by the aberration correction quantity switching device 14 corresponds to a base material thickness error of ±10 μm relative to the reference disk. However, the present invention is not limited to this base material thickness error. For example, the same result can be obtained even when the quantity of aberration correction is determined based on a standard thickness of an intermediate layer of a two-layer disk. Specifically, it is possible that the quantity of spherical aberration correction for one recording plane of the two-layer disk is set to 0 mλ, and that for the other recording plane is set while considering the standard thickness of the intermediate layer.

As the method for discriminating the type of an optical disk with the disk discrimination device 12 in this embodiment, any method can be used as long as it distinguishes the type of an optical disk, e.g., a method in which discrimination is made by detecting a hole formed in a cartridge for housing an optical disk, by the shape of the cartridge, or by using the quantity of light reflected from the optical disk to distinguish between a single-layer disk and a two-layer disk.

Embodiment 2

The following is an explanation of Embodiment 2. Here, the identical elements to those in Embodiment 1 are denoted by the same reference numerals and the detailed description will be omitted.

Figure 3:
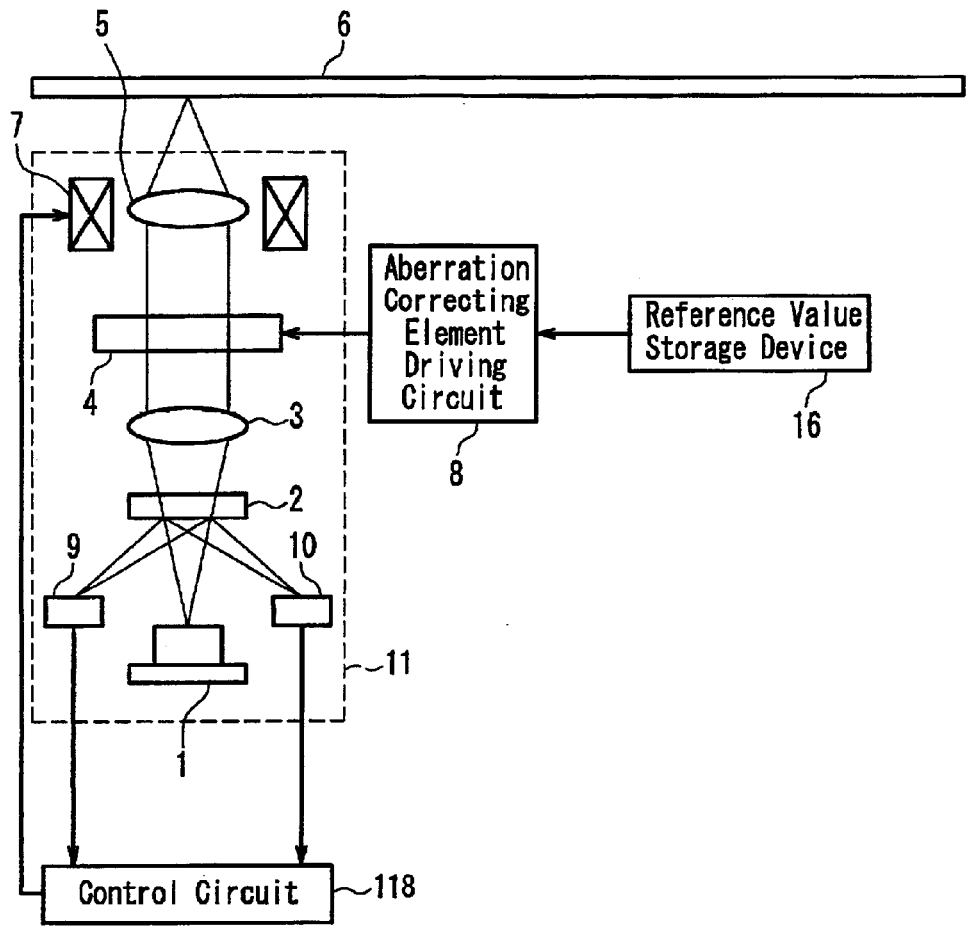
FIG. 3 is a schematic cross-sectional view of an optical disk apparatus according to Embodiment 2 of the present invention.

FIG. 3 shows the configuration of an optical disk apparatus according to Embodiment 2 of the present invention. The optical disk apparatus of this embodiment includes an optical pickup 11, an aberration correcting element driving circuit 8, a control circuit 118, and a reference value storage device 16. The optical pickup 11 is the same as that shown in FIG. 13, which has been explained in the conventional example. The aberration correcting element driving circuit 8 drives a liquid crystal aberration correcting element (an aberration correcting system) 4. The control circuit 118 receives a signal from the optical pickup 11 and drives an objective lens 5. The reference value storage device 16 stores the quantity of spherical aberration correction obtained when the liquid crystal aberration correcting element 4 corrects spherical aberration optimally for the optical disk having a reference thickness.

The reference value storage device 16 prestores the quantity of spherical aberration corrected by the liquid crystal aberration correcting element 4 when the optical pickup 11 is assembled and adjusted with the optical disk having a reference thickness (e.g., a base material thickness of 100 $\mu$m). The reference thickness of a disk may be set by the standard value of a base material thickness of the first optical disk 71 in FIG. 2A or the second optical disk 75 in FIG. 2B.

As the reference value storage device 16, any means can be used as long as it stores a second quantity of spherical aberration correction, e.g., a variable resistor, a flash memory or EEPROM.

Next, the procedure for correcting spherical aberration of this embodiment will be described. The spherical aberration correcting operation can start when, e.g., an optical disk is installed in the optical disk apparatus or the apparatus is turned on. An output signal from the reference value storage device 16 is input to the aberration correcting element driving circuit 8. The liquid crystal aberration correcting element 4 corrects the spherical aberration while considering the spherical aberration inherent in each of different optical pickups 11. Therefore, a stable focus error signal can be provided in focusing control that is performed on the recording layer after the correction.

As described above, in an optical disk apparatus of this embodiment, the reference value storage device 16 prestores the quantity of spherical aberration correction of the liquid crystal aberration correcting element 4 obtained when the optical pickup is assembled and adjusted with the optical disk having a reference thickness. Using this quantity of spherical aberration correction, the correction of spherical aberration for the recording plane of an optical disk that is subjected to focusing control is performed before operating the focusing control. Thus, a favorable focus error signal can be provided in the subsequent focusing control, so that the effect of operating stable focusing control can be achieved.

There are some cases in which spherical aberration varies with each optical pickup due to adjustment errors during assembly of a lens element and an optical pickup. In this embodiment, the quantity of correction (which differs depending on the optical pickup) required to correct the spherical aberration inherent in the optical pickup has been stored in the reference value storage device 16. Thus, the spherical aberration is corrected before operating focusing control while considering the spherical aberration inherent in the optical pickup. This makes it possible to provide a stable focus error signal amplitude in the subsequent focusing control.

Embodiment 3

The following is an explanation of Embodiment 3. Here, the identical elements to those in Embodiments 1 and 2 are denoted by the same reference numerals and the detailed description will be omitted.

Figure 4:
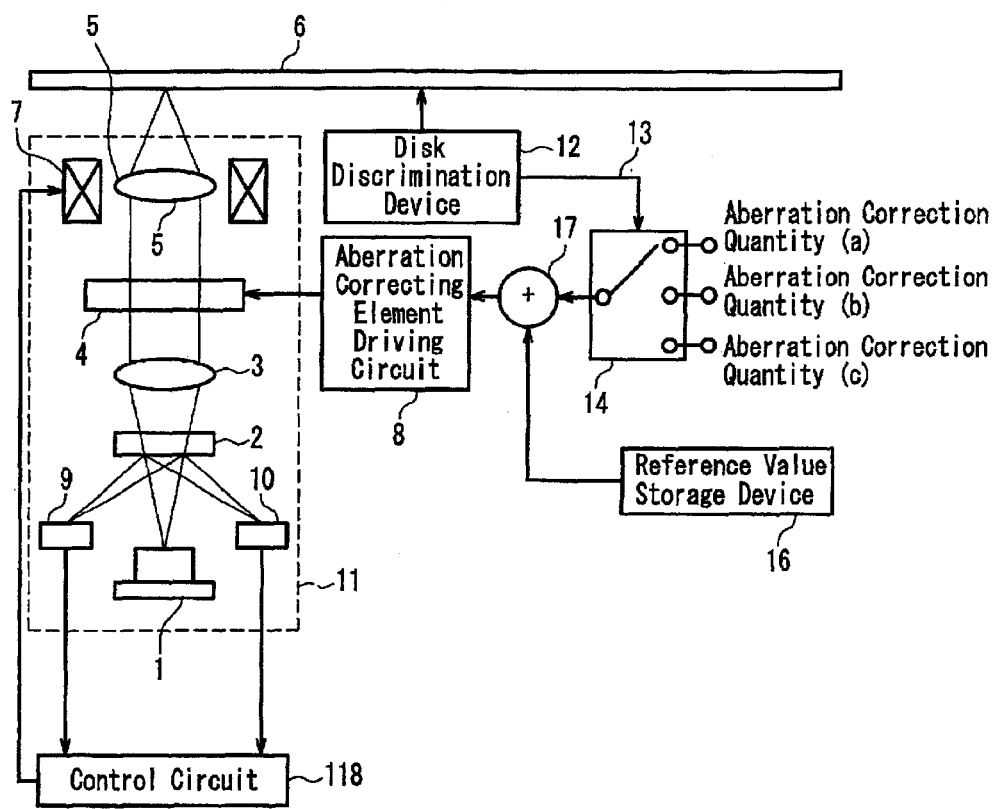
FIG. 4 is a schematic cross-sectional view of an optical disk apparatus according to Embodiment 3 of the present invention.

FIG. 4 shows the configuration of an optical disk apparatus according to Embodiment 3 of the present invention. The optical disk apparatus of this embodiment includes an optical pickup 11, an aberration correcting element driving circuit 8, a control circuit 118, a disk discrimination device 12, an aberration correction quantity switching device 14, a reference value storage device 16, and an adder 17. The optical pickup 11 is the same as that shown in FIG. 13, which has been explained in the conventional example. The aberration correcting element driving circuit 8 drives a liquid crystal aberration correcting element (an aberration correcting system) 4. The control circuit 118 receives a signal from the optical pickup 11 and drives an objective lens 5. The disk discrimination device 12 discriminates the type of an optical disk. The aberration correction quantity switching device 14 selects and switches the quantity of spherical aberration to be corrected by the liquid crystal aberration correcting element 4 (a first quantity of spherical aberration correction) based on a disk discrimination signal 13 output from the disk discrimination device 12. The reference value storage device 16 stores the quantity of spherical aberration correction (a second quantity of spherical aberration correction) obtained when the liquid crystal aberration correcting element 4 corrects spherical aberration optimally for the optical disk having a reference thickness. The adder 17 is a circuit for adding the first and second quantities of spherical aberration correction, the first quantity being an output signal from the aberration correction quantity switching device 14 and the second quantity being an output signal from the reference value storage device 16.

The reference value storage device 16 prestores the quantity of spherical aberration corrected by the liquid crystal aberration correcting element 4 when the optical pickup 11 is assembled and adjusted with the optical disk having a reference thickness (e.g., a base material thickness of 100 $\mu$m) as the second quantity of spherical aberration correction. The reference thickness of a disk may be set by the standard value of a base material thickness of the first optical disk 71 in FIG. 2A or the second optical disk 75 in FIG. 2B.

As the reference value storage device 16, any means can be used as long as it stores the second quantity of spherical aberration correction, e.g., a variable resistor, a flash memory or EEPROM, and the same effect can be obtained.

Next, the procedure for correcting spherical aberration of this embodiment will be described. The spherical aberration correcting operation can start when, e.g., an optical disk is installed in the optical disk apparatus or the apparatus is turned on. First, the disk discrimination device 12 discriminates the type of the optical disk. When it turns out that the optical disk has a single recording layer (the first optical disk 71), the aberration correction quantity switching device 14 selects the aberration correction quantity (a) according to the instructions of the disk discrimination signal 13. The quantity (a) is used to correct a spherical aberration that corresponds to a base material thickness error of 0 µm relative to the reference disk. Then, the output signal (i.e., the first quantity of spherical aberration correction) from the aberration correction quantity switching device 14 is input to the adder 17. Moreover, the output signal (i.e., the second quantity of spherical aberration correction) from the reference value storage device 16 also is input to the adder 17. The adder 17 adds the first and second quantities and outputs the result to the aberration correcting element driving circuit 8. The liquid crystal aberration correcting element 4 corrects spherical aberration while considering the spherical aberration inherent in each of different optical pickups 11. Therefore, a stable focus error signal can be provided in focusing control that is performed on the recording layer after the correction.

Next, the correction of spherical aberration for a two-layer disk will be described.

When the optical disk having two recording layers (the second optical disk 75) is discriminated by the disk discrimination device 12 and focusing control is performed on the L0 layer 77, the aberration correction quantity switching device 14 selects the aberration correction quantity (b) according to the instructions of the disk discrimination signal 13. The quantity (b) is used to correct a spherical aberration that corresponds to a base material thickness error of 10 µm by which the base material of the optical disk is thinner than that of the reference disk. Then, the output signal (i.e., the first quantity of spherical aberration correction) from the aberration correction quantity switching device 14 is input to the adder 17. Moreover, the output signal (i.e., the second quantity of spherical aberration correction) from the reference value storage device 16 also is input to the adder 17. The adder 17 adds the first and second quantities and outputs the result to the aberration correcting element driving circuit 8. The liquid crystal aberration correcting element 4 corrects spherical aberration while considering the spherical aberration inherent in each of different optical pickups 11. Therefore, a stable focus error signal can be provided in focusing control that is performed on the L0 layer 77 after the correction.

Similarly, when the optical disk having two recording layers (the second optical disk 75) is discriminated by the disk discrimination device 12 and focusing control is performed on the L1 layer 79, the aberration correction quantity switching device 14 selects the aberration correction quantity (c) according to the instructions of the disk discrimination signal 13. The quantity (c) is used to correct a spherical aberration that corresponds to a base material thickness error of 10 µm by which the base material of the optical disk is thicker than that of the reference disk. Then, the output signal (i.e., the first quantity of spherical aberration correction) from the aberration correction quantity switching device 14 is input to the adder 17. Moreover, the output signal (i.e., the second quantity of spherical aberration correction) from the reference value storage device 16 also is input to the adder 17. The adder 17 adds the first and second quantities and outputs the result to the aberration correcting element driving circuit 8. The liquid crystal aberration correcting element 4 corrects spherical aberration while considering the spherical aberration inherent in each of different optical pickups 11. Therefore, a stable focus error signal can be provided in focusing control that is performed on the L1 layer 79 after the correction.

As described above, in an optical disk apparatus of this embodiment, the reference value storage device 16 prestores the quantity of spherical aberration correction (the second quantity) of the liquid crystal aberration correcting element 4 obtained when the optical pickup is assembled and adjusted with the optical disk having a reference thickness. Further, the quantity of spherical aberration correction (the first quantity) that corresponds to the type of the disk and the recording plane to be subjected to focusing control is selected. Using the quantity of spherical aberration correction obtained by adding the first and second quantities, the correction of spherical aberration for the recording plane of an optical disk that is subjected to focusing control is performed before operating the focusing control. Thus, a favorable focus error signal can be provided in the subsequent focusing control, so that the effect of operating stable focusing control can be achieved.

There are some cases in which spherical aberration varies with each optical pickup due to adjustment errors during assembly of a lens element and an optical pickup. In this embodiment, the quantity of correction (which differs depending on the optical pickup) required to correct the spherical aberration inherent in the optical pickup has been stored in the reference value storage device 16. Thus, spherical aberration is corrected before operating focusing control while considering the spherical aberration inherent in the optical pickup. This makes it possible to provide a stable focus error signal amplitude in the subsequent focusing control.

This embodiment starts the correction of spherical aberration before operating focusing control. The quantity of spherical aberration correction is predetermined for each recording plane of an optical disk that is subjected to focusing control, among which an appropriate quantity is selected and switched in accordance with the type of the optical disk and the target recording plane.

In the above example, the reference value storage device 16 stores the quantity of spherical aberration correction of the liquid crystal aberration correcting element 4 obtained when the optical pickup is assembled and adjusted with one optical disk. However, the present invention is not limited thereto. For example, the reference value storage device 16 may store a plurality of quantities of spherical aberration correction (the second quantity of spherical aberration correction) that are optimized for each type of reference optical disks, such as a two-layer disk and a single-layer disk with different base material thicknesses, and the second quantity of spherical aberration correction corresponding to the result of discrimination by the disk discrimination device 12 can be input to the adder 17.

As the method for discriminating the type of an optical disk with the disk discrimination device 12 in this embodiment, any method can be used as long as it distinguishes the type of an optical disk, e.g., a method in which discrimination is made by detecting a hole formed in a cartridge for housing an optical disk, by the shape of the cartridge, or by using the quantity of light reflected from the optical disk to distinguish between a single-layer disk and a two-layer disk.

Embodiment 4

The following is an explanation of Embodiment 4. Here, the identical elements to those in Embodiments 1 to 3 are denoted by the same reference numerals and the detailed description will be omitted.

Figure 5:
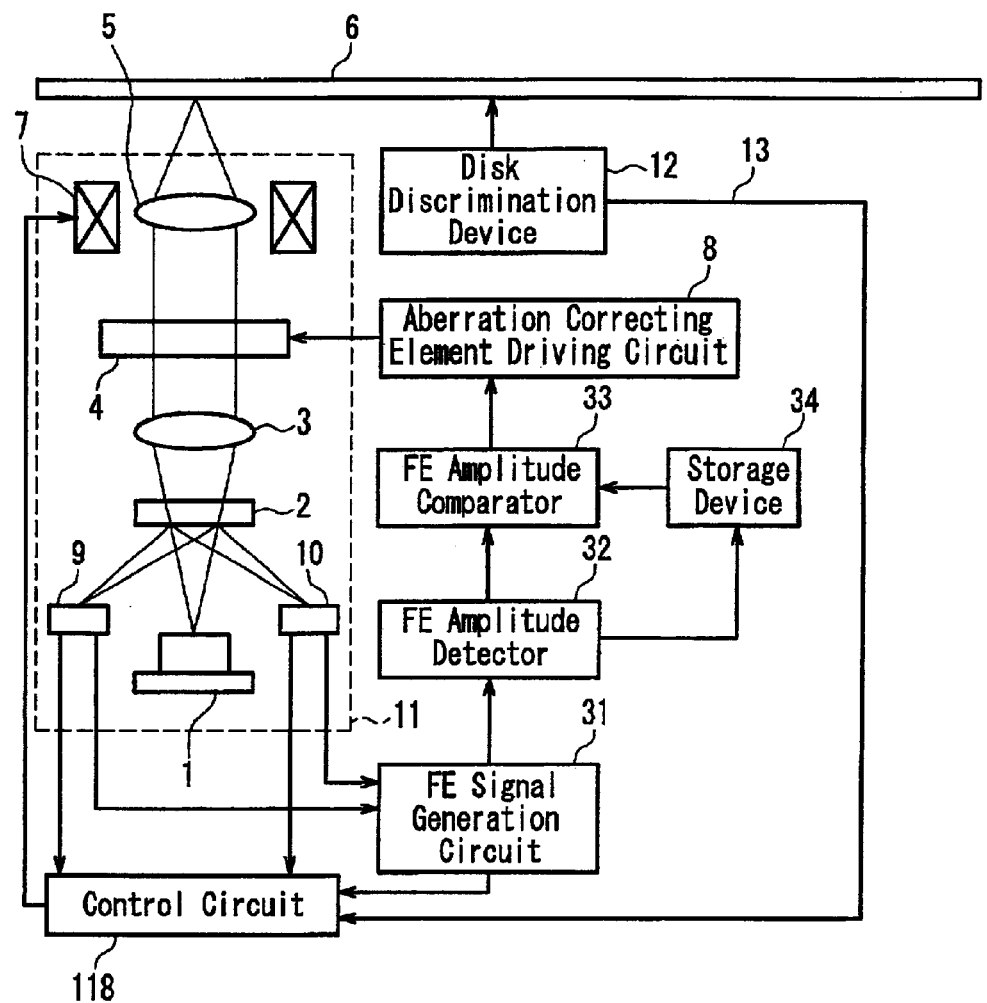
FIG. 5 is a schematic cross-sectional view of an optical disk apparatus according to Embodiment 4 of the present invention.

FIG. 5 shows the configuration of an optical disk apparatus according to Embodiment 4 of the present invention. The optical disk apparatus of this embodiment includes an optical pickup 11, an aberration correcting element driving circuit 8, a control circuit 118, a disk discrimination device 12, an FE signal generation circuit 31, an FE amplitude detector 32, a storage device 34, and an FE amplitude comparator 33. The optical pickup 11 is the same as that shown in FIG. 13, which has been explained in the conventional example. The aberration correcting element driving circuit 8 drives a liquid crystal aberration correcting element (an aberration correcting system) 4. The control circuit 118 receives a signal from the optical pickup 11 and drives an objective lens 5. The disk discrimination device 12 discriminates the type of an optical disk. The FE signal generation circuit 31 generates a focus error (FE) signal. The FE amplitude detector 32 detects the amplitude of the focus error signal. The storage device 34 stores the focus error signal. The FE amplitude comparator 33 makes a comparison between amplitudes of the focus error signals before and after changing the quantity of spherical aberration correction of the liquid crystal aberration correcting element 4.

Figure 6:
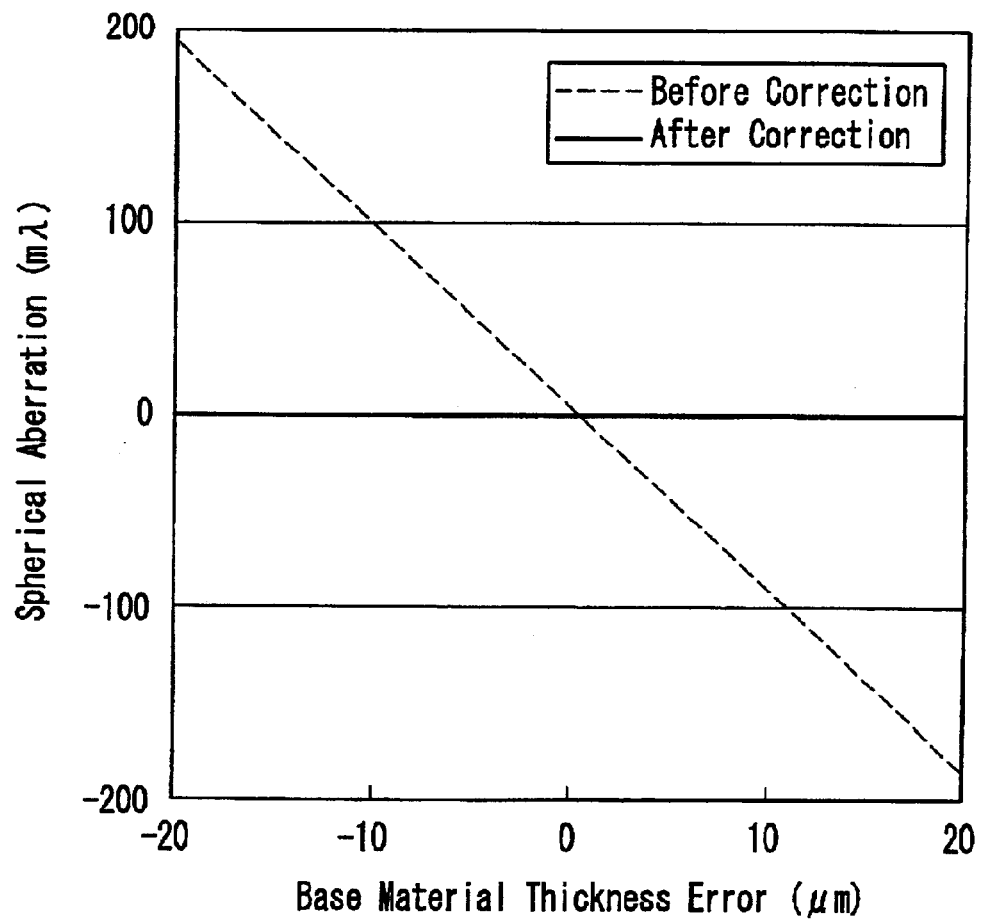
FIG. 6 is a graph showing an example of calculation of spherical aberration caused by a base material thickness error of an optical disk.

FIG. 6 shows an example of the calculation of spherical aberration caused by a base material thickness error of an optical disk 6. The dotted line indicates the spherical aberration before correction, and the solid line indicates the spherical aberration after correction. A base material thickness error of ±20 µm causes a spherical aberration of about 190 mλ, and the correction of spherical aberration allows the spherical aberration to be corrected properly as represented by the solid line in FIG. 6.

Figure 7A:
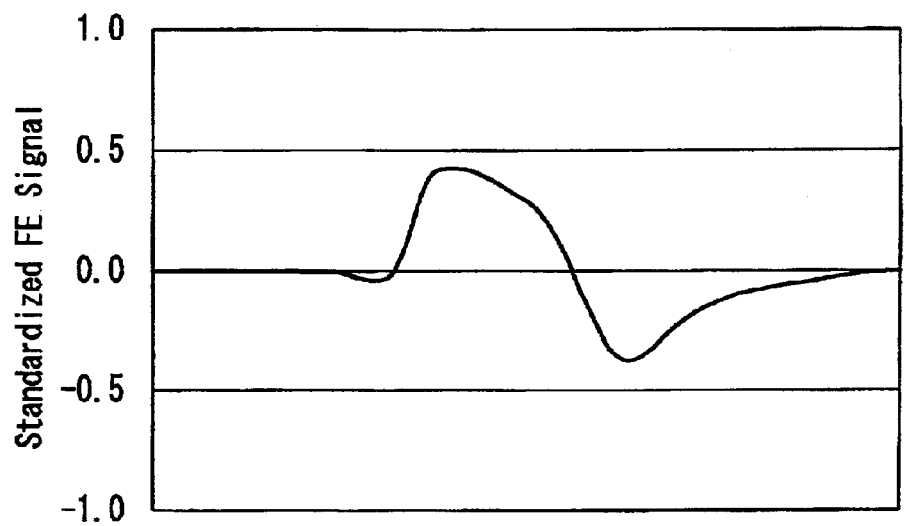
FIGS. 7A and 7B are graphs showing an example of calculation of a focus error signal for an optical disk having a base material thickness error of −20 $\mu$m.
Figure 7B:
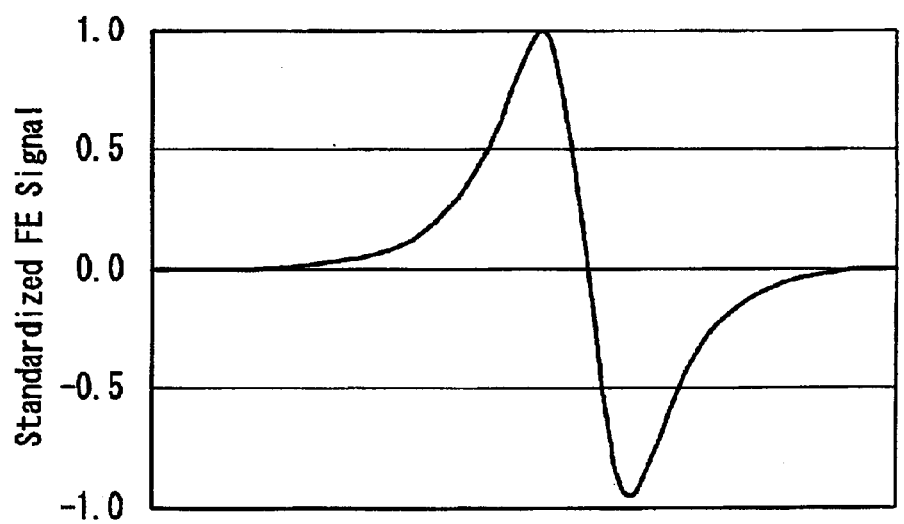

FIGS. 7A and 7B show examples of the calculation of a focus error signal for the optical disk having a base material thickness error of −20 µm. The focus error signals plotted on the vertical axis are standardized by the amplitude of a focus error signal when spherical aberration is corrected to 0 mλ. The horizontal axis represents the distance between a recording layer of the optical disk and the objective lens. The objective lens used for the calculation has a numerical aperture of 0.85.

FIG. 7A shows a focus error signal before correcting spherical aberration. The base material thickness error of −20 µm causes a spherical aberration of about 190 mλ, as shown in FIG. 6. Therefore, the amplitude of the focus error signal is reduced and the shape becomes asymmetrical due to the influence of this spherical aberration.

FIG. 7B shows a focus error signal after correcting the spherical aberration, in which a considerable improvement in amplitude and shape of the focus error signal is achieved.

As can be seen from FIGS. 7A and 7B, the correction of spherical aberration increases the amplitude of a focus error signal and improves the linearity and symmetry in the shape of the focus error signal, thus providing a favorable focus error signal. In this embodiment, the quantity of correction required to correct spherical aberration caused by base material thickness errors that differ depending on the optical disk is predetermined, and spherical aberration is corrected with this quantity, followed by focusing control.

Next, the procedure for correcting spherical aberration of this embodiment will be described.

First, the disk discrimination device 12 discriminates the type of the optical disk. For example, it determines whether the optical disk installed in the optical disk apparatus is a single-layer disk (FIG. 2A) or a two-layer disk (FIG. 2B). In the case of a multi-layer disk, it determines which recording layer is subjected to focusing control.

The correction of spherical aberration for the optical disk 71 in FIG. 2A will be described as an example. First, the amplitude of a focus error signal output from the FE signal generation circuit 31 (a first amplitude FE0) is measured by the FE amplitude detector 32 and stored in the storage device 34. Then, the quantity of spherical aberration correction of the liquid crystal aberration correcting element 4 is changed.

The amplitude of a focus error signal output from the FE signal generation circuit 31 after the change (a second amplitude FE1) is measured by the FE amplitude detector 32. The FE amplitude comparator 33 compares the first amplitude FE0 stored in the storage device 34 with the second amplitude FE1. Thereafter, such a series of steps is repeated until the amplitude of the focus error signal reaches to a maximum. The quantity of spherical aberration correction of the liquid crystal aberration correcting element 4 obtained when the amplitude of the focus error signal is maximized is optimum for the recording layer of the first optical disk 71.

In an optical disk apparatus of the present invention, a learning operation for acquiring the optimum quantity of spherical aberration correction for the recording plane of an optical disk that is subjected to focusing control is performed before operating the focusing control. Then, the liquid crystal aberration correcting element 4 corrects aberration with the optimum quantity of spherical aberration correction thus obtained, followed by focusing control. Consequently, a favorable focus error signal can be provided in focusing control, so that the effect of operating stable focusing control can be achieved.

The optical disk apparatus of this embodiment starts the correction of spherical aberration before operating focusing control. The learning operation for acquiring the optimum quantity of spherical aberration correction can be performed each time immediately before the focusing control starts. Alternately, e.g., the learning operation for acquiring the optimum quantities of spherical aberration correction for every recording layer can be performed when an optical disk is installed in the optical disk apparatus or the apparatus is turned on, and the obtained quantities that correspond to the respective recording layers may be stored in a memory.

The above example has described the method in which the amplitude of a focus error signal is maximized to acquire the optimum quantity of spherical aberration correction of the liquid crystal aberration correcting element 4. However, the present invention is not limited thereto. The same effect can be obtained, e.g., by a method for maximizing the amplitude of a reproduction signal instead of the focus error signal, a method for maximizing the entire quantity of light, or the like.

As the method for discriminating the type of an optical disk with the disk discrimination device 12 in this embodiment, any method can be used as long as it distinguishes the type of an optical disk, e.g., a method in which discrimination is made by detecting a hole formed in a cartridge for housing an optical disk, by the shape of the cartridge, or by using the quantity of light reflected from the optical disk to distinguish between a single-layer disk and a two-layer disk.

Embodiment 5

Figure 8:
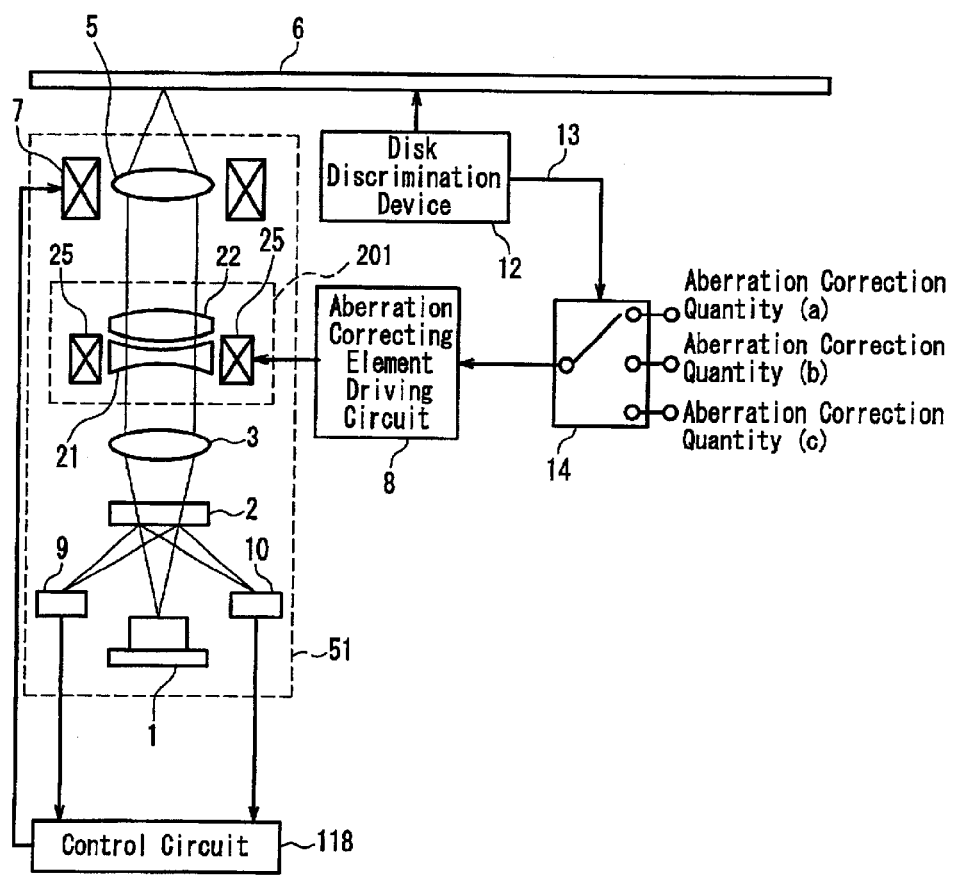
FIG. 8 is a schematic cross-sectional view of an optical disk apparatus according to Embodiment 5 of the present invention.

FIG. 8 shows the configuration of an optical disk apparatus according to Embodiment 5 of the present invention. The optical disk apparatus of this embodiment includes an optical pickup 51, an aberration correcting element driving circuit 8, a control circuit 118, a disk discrimination device 12, and an aberration correction quantity switching device 14. The optical pickup 51 uses an aberration correcting lens group (an aberration correcting system) 201 instead of the liquid crystal aberration correcting element 4 of the optical pickup 11 shown in FIG. 13, which has been explained in the conventional example. The aberration correcting element driving circuit 8 drives the aberration correcting lens group 201. The control circuit 118 receives a signal from the optical pickup 51 and drives an objective lens 5. The disk discrimination device 12 discriminates the type of an optical disk. The aberration correction quantity switching device 14 selects and switches the quantity of spherical aberration to be corrected by the aberration correcting lens group 201 based on a disk discrimination signal 13 output from the disk discrimination device 12.

The aberration correcting lens group 201 includes two lens groups, composed of a positive lens group 22 and a negative lens group 21, and a driving portion 25 for shifting the negative lens group 21 in the optical axis direction.

Since the optical pickup 51 has the same configuration as that shown in FIG. 13 except for the aberration correcting lens group 201, the identical elements to those in FIG. 13 are denoted by the same reference numerals and the detailed description will be omitted.

The following is an explanation of the aberration correction quantity switching device 14. For example, the base material thickness of a reference disk is 100 μm. The aberration correction quantity switching device 14 has three predetermined aberration correction quantities: (a) a quantity of spherical aberration correction of 0 mλ; (b) a quantity of spherical aberration correction for an optical disk whose base material thickness is 10 μm thinner than that of the reference disk; and (c) a quantity of spherical aberration correction for an optical disk whose base material thickness is 10 μm thicker than that of the reference disk. The aberration correction quantity switching device 14 selects and switches an appropriate quantity for correcting spherical aberration among the three quantities in accordance with the disk discrimination signal 13 from the disk discrimination device 12.

Next, the procedure for correcting spherical aberration of this embodiment will be described. The spherical aberration correcting operation can start when, e.g., an optical disk is installed in the optical disk apparatus or the apparatus is turned on. First, the disk discrimination device 12 discriminates the type of the optical disk. When it turns out that the optical disk has a single recording layer (the first optical disk 71), the aberration correction quantity switching device 14 selects the aberration correction quantity (a) according to the instructions of the disk discrimination signal 13. Thus, the aberration correcting lens group 201 corrects a spherical aberration that corresponds to a base material thickness error of 0 μm relative to the reference disk. Consequently, a stable focus error signal can be provided in focusing control that is performed on the recording layer after the correction.

Next, the correction of spherical aberration for a two-layer disk will be described.

When the optical disk having two recording layers (the second optical disk 75) is discriminated by the disk discrimination device 12 and focusing control is performed on the L0 layer 77, the aberration correction quantity switching device 14 selects the aberration correction quantity (b) according to the instructions of the disk discrimination signal 13. Thus, the aberration correcting lens group 201 corrects a spherical aberration that corresponds to a base material thickness error of 10 μm by which the base material of the optical disk is thinner than that of the reference disk. Consequently, a stable focus error signal can be provided in focusing control that is performed on the L0 layer 77 after the correction.

Similarly, when the optical disk having two recording layers (the second optical disk 75) is discriminated by the disk discrimination device 12 and focusing control is performed on the L1 layer 79, the aberration correction quantity switching device 14 selects the aberration correction quantity (c) according to the instructions of the disk discrimination signal 13. Thus, the aberration correcting lens group 201 corrects a spherical aberration that corresponds to a base material thickness error of 10 μm by which the base material of the optical disk is thicker than that of the reference disk. Consequently, a stable focus error signal can be provided in focusing control that is performed on the L1 layer 79 after the correction.

In an optical disk apparatus of this embodiment, the correction of spherical aberration for the recording plane of an optical disk that is subjected to focusing control is performed before operating the focusing control. Thus, a favorable focus error signal can be provided in the subsequent focusing control, so that the effect of operating stable focusing control can be achieved.

This embodiment starts the correction of spherical aberration before operating focusing control. The quantity of spherical aberration correction is predetermined for each recording plane of an optical disk that is subjected to focusing control, among which an appropriate quantity is selected and switched in accordance with the type of the disk and the target recording plane. In this embodiment, it is estimated that the quantity of correction to be selected by the aberration correction quantity switching device 14 corresponds to a base material thickness error of ±10 μm relative to the reference disk. However, the present invention is not limited to this base material thickness error. For example, the same result can be obtained even when the quantity of aberration correction is determined based on a standard thickness of an intermediate layer of a two-layer disk. Specifically, it is possible that the quantity of spherical aberration correction for one recording plane of the two-layer disk is set to 0 mλ, and that for the other recording plane is set while considering the standard thickness of the intermediate layer.

As the method for discriminating the type of an optical disk with the disk discrimination device 12 in this embodiment, any method can be used as long as it distinguishes the type of an optical disk, e.g., a method in which discrimination is made by detecting a hole formed in a cartridge for housing an optical disk, by the shape of the cartridge, or by using the quantity of light reflected from the optical disk to distinguish between a single-layer disk and a two-layer disk.

Embodiment 6

The following is an explanation of Embodiment 6. Here, the identical elements to those in Embodiments 1 to 5 are denoted by the same reference numerals and the detailed description will be omitted.

Figure 9:
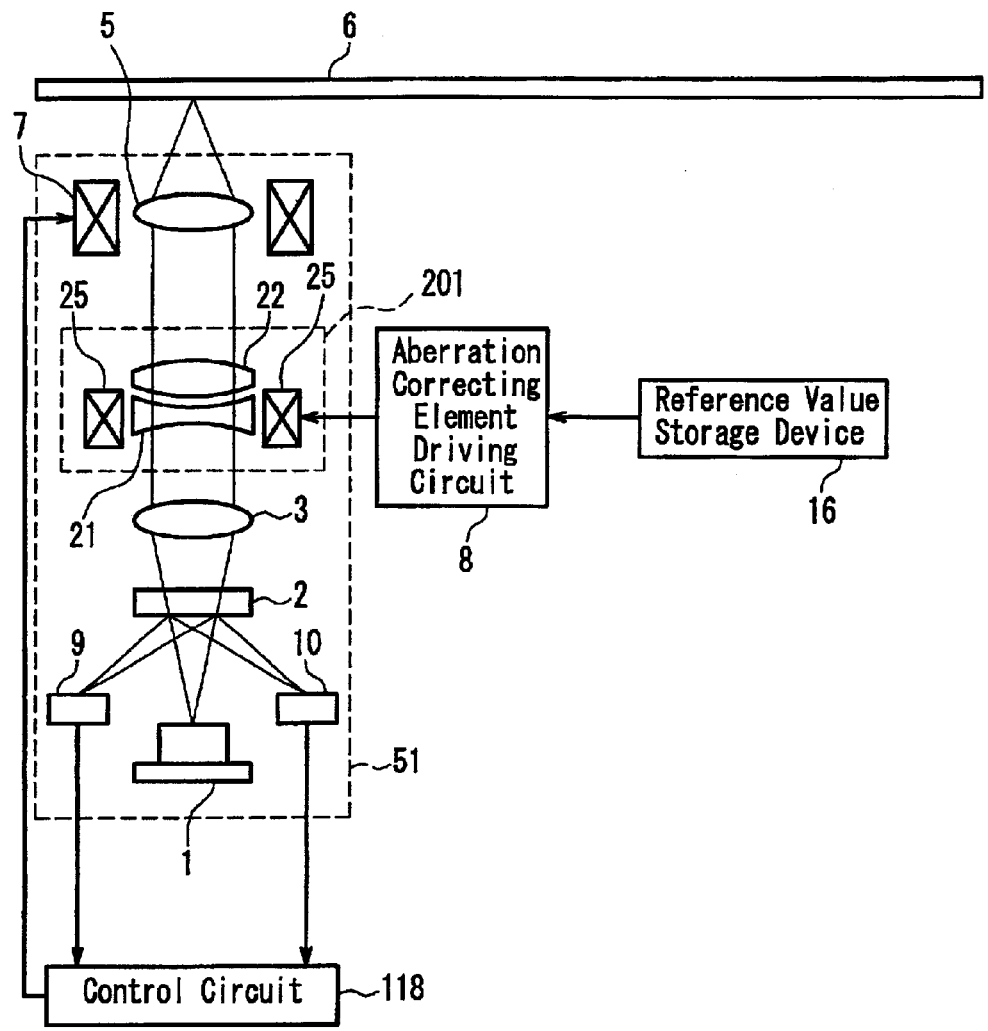
FIG. 9 is a schematic cross-sectional view of an optical disk apparatus according to Embodiment 6 of the present invention.

FIG. 9 shows the configuration of an optical disk apparatus according to Embodiment 6 of the present invention. The optical disk apparatus of this embodiment includes an optical pickup 51, an aberration correcting element driving circuit 8, a control circuit 118, and a reference value storage device 16. The optical pickup 51 is the same as that in Embodiment 5. The aberration correcting element driving circuit 8 drives an aberration correcting lens group (an aberration correcting system) 201. The control circuit 118 receives a signal from the optical pickup 51 and drives an objective lens 5. The reference value storage device 16 stores the quantity of spherical aberration correction obtained when the aberration correcting lens group 201 corrects spherical aberration optimally for the optical disk having a reference thickness.

The aberration correcting lens group 201 includes two lens groups, composed of a positive lens group 22 and a negative lens group 21, and a driving portion 25 for shifting the negative lens group 21 in the optical axis direction.

The reference value storage device 16 prestores the quantity of spherical aberration corrected by the aberration correcting lens group 201 when the optical pickup 51 is assembled and adjusted with the optical disk having a reference thickness (e.g., a base material thickness of 100 $\mu$m). The reference thickness of a disk may be set by the standard value of a base material thickness of the first optical disk 71 in FIG. 2A or the second optical disk 75 in FIG. 2B.

As the reference value storage device 16, any means can be used as long as it stores a second quantity of spherical aberration correction, e.g., a variable resistor, a flash memory or EEPROM.

Next, the procedure for correcting spherical aberration of this embodiment will be described. The spherical aberration correcting operation can start when, e.g., an optical disk is installed in the optical disk apparatus or the apparatus is turned on. An output signal from the reference value storage device 16 is input to the aberration correcting element driving circuit 8. The aberration correcting lens group 201 corrects spherical aberration while considering the spherical aberration inherent in each of different optical pickups 11. Therefore, a stable focus error signal can be provided in focusing control that is performed on the recording layer after the correction.

As described above, in an optical disk apparatus of this embodiment, the reference value storage device 16 prestores the quantity of spherical aberration correction of the aberration correcting lens group 201 obtained when the optical pickup is assembled and adjusted with the optical disk having a reference thickness. Using this quantity of spherical aberration correction, the correction of spherical aberration for the recording plane of an optical disk that is subjected to focusing control is performed before operating the focusing control. Thus, a favorable focus error signal can be provided in the subsequent focusing control, so that the effect of operating stable focusing control can be achieved.

There are some cases in which spherical aberration varies with each optical pickup due to adjustment errors during assembly of a lens element and an optical pickup. In this embodiment, the quantity of correction (which differs depending on the optical pickup) required to correct the spherical aberration inherent in the optical pickup has been stored in the reference value storage device 16. Thus, spherical aberration is corrected before operating focusing control while considering the spherical aberration inherent in the optical pickup. This makes it possible to provide a stable focus error signal amplitude in the subsequent focusing control.

Embodiment 7

The following is an explanation of Embodiment 7. Here, the identical elements to those in Embodiments 1 to 6 are denoted by the same reference numerals and the detailed description will be omitted.

Figure 10:
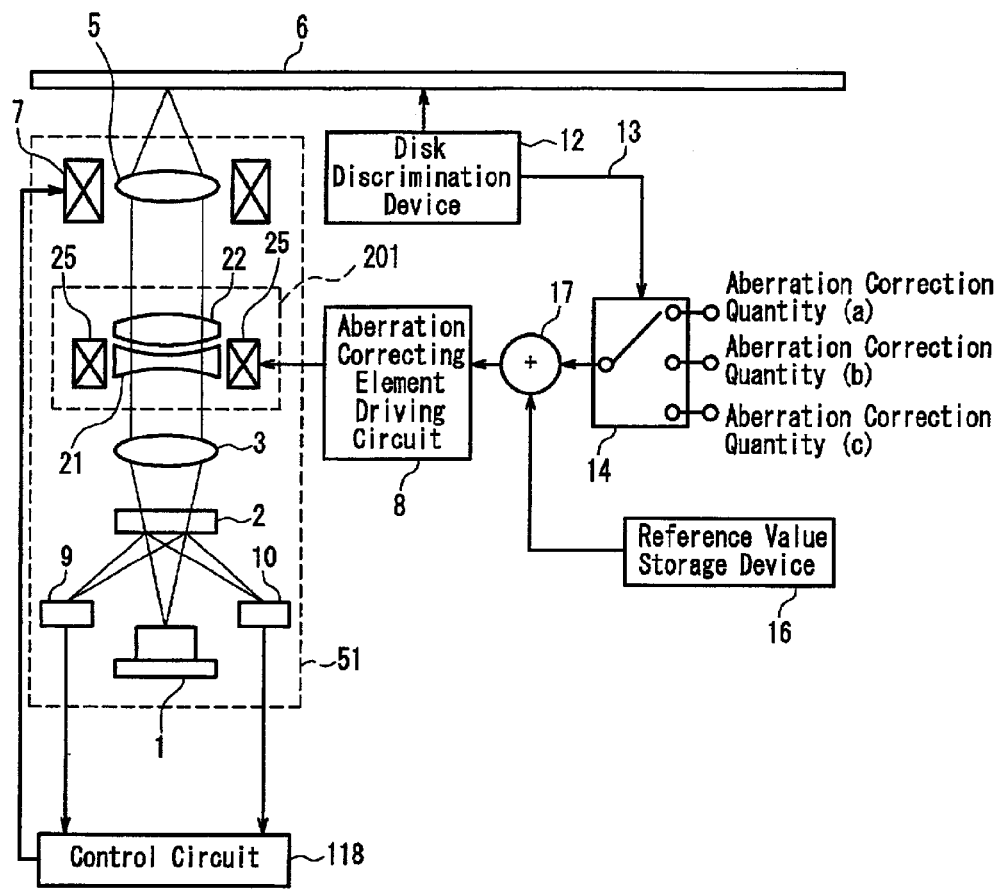
FIG. 10 is a schematic cross-sectional view of an optical disk apparatus according to Embodiment 7 of the present invention.

FIG. 10 shows the configuration of an optical disk apparatus according to Embodiment 7 of the present invention. The optical disk apparatus of this embodiment includes an optical pickup 51, an aberration correcting element driving circuit 8, a control circuit 118, a disk discrimination device 12, an aberration correction quantity switching device 14, a reference value storage device 16, and an adder 17. The optical pickup 51 is the same as that in Embodiment 5. The aberration correcting element driving circuit 8 drives an aberration correcting lens group (an aberration correcting system) 201. The control circuit 118 receives a signal from the optical pickup 51 and drives an objective lens 5. The disk discrimination device 12 discriminates the type of an optical disk. The aberration correction quantity switching device 14 selects and switches the quantity of spherical aberration to be corrected by the aberration correcting lens group 201 (a first quantity of spherical aberration correction) based on a disk discrimination signal 13 output from the disk discrimination device 12. The reference value storage device 16 stores the quantity of spherical aberration correction (a second quantity of spherical aberration correction) obtained when the aberration correcting lens group 201 corrects spherical aberration optimally for the optical disk having a reference thickness. The adder 17 is a circuit for adding the first and second quantities of spherical aberration correction, the first quantity being an output signal from the aberration correction quantity switching device 14 and the second quantity being an output signal from the reference value storage device 16.

The aberration correcting lens group 201 includes two lens groups, composed of a positive lens group 22 and a negative lens group 21, and a driving portion 25 for shifting the negative lens group 21 in the optical axis direction.

The reference value storage device 16 prestores the quantity of spherical aberration corrected by the aberration correcting lens group 201 when the optical pickup 51 is assembled and adjusted with the optical disk having a reference thickness (e.g., a base material thickness of 100 $\mu$m) as the second quantity of spherical aberration correction. The reference thickness of a disk may be set by the standard value of a base material thickness of the first optical disk 71 in FIG. 2A or the second optical disk 75 in FIG. 2B.

As the reference value storage device 16, any means can be used as long as it stores the second quantity of spherical aberration correction, e.g., a variable resistor, a flash memory or EEPROM, and the same effect can be obtained.

Next, the procedure for correcting spherical aberration of this embodiment will be described. The spherical aberration correcting operation can start when, e.g., an optical disk is installed in the optical disk apparatus or the apparatus is turned on. First, the disk discrimination device 12 discriminates the type of the optical disk. When it turns out that the optical disk has a single recording layer (the first optical disk 71), the aberration correction quantity switching device 14 selects the aberration correction quantity (a) according to the instructions of the disk discrimination signal 13. The quantity (a) is used to correct a spherical aberration that corresponds to a base material thickness error of 0 $\mu$m relative to the reference disk. Then, the output signal (i.e., the first quantity of spherical aberration correction) from the aberration correction quantity switching device 14 is input to the adder 17. Moreover, the output signal (i.e., the second quantity of spherical aberration correction) from the reference value storage device 16 also is input to the adder 17. The adder 17 adds the first and second quantities and outputs the result to the aberration correcting element driving circuit 8. The aberration correcting lens group 201 corrects spherical aberration while considering the spherical aberration inherent in each of different optical pickups 11. Therefore, a stable focus error signal can be provided in focusing control that is performed on the recording layer after the correction.

Next, the correction of spherical aberration for a two-layer disk will be described.

When the optical disk having two recording layers (the second optical disk 75) is discriminated by the disk discrimination device 12 and focusing control is performed on the L0 layer 77, the aberration correction quantity switching device 14 selects the aberration correction quantity (b) according to the instructions of the disk discrimination signal 13. The quantity (b) is used to correct a spherical aberration that corresponds to a base material thickness error of 10 μm by which the base material of the optical disk is thinner than that of the reference disk. Then, the output signal (i.e., the first quantity of spherical aberration correction) from the aberration correction quantity switching device 14 is input to the adder 17. Moreover, the output signal (i.e., the second quantity of spherical aberration correction) from the reference value storage device 16 also is input to the adder 17. The adder 17 adds the first and second quantities and outputs the result to the aberration correcting element driving circuit 8. The aberration correcting lens group 201 corrects spherical aberration while considering the spherical aberration inherent in each of different optical pickups 11. Therefore, a stable focus error signal can be provided in focusing control that is performed on the L0 layer 77 after the correction.

Similarly, when the optical disk having two recording layers (the second optical disk 75) is discriminated by the disk discrimination device 12 and focusing control is performed on the L1 layer 79, the aberration correction quantity switching device 14 selects the aberration correction quantity (c) according to the instructions of the disk discrimination signal 13. The quantity (c) is used to correct a spherical aberration that corresponds to a base material thickness error of 10 μm by which the base material of the optical disk is thicker than that of the reference disk. Then, the output signal (i.e., the first quantity of spherical aberration correction) from the aberration correction quantity switching device 14 is input to the adder 17. Moreover, the output signal (i.e., the second quantity of spherical aberration correction) from the reference value storage device 16 also is input to the adder 17. The adder 17 adds the first and second quantities and outputs the result to the aberration correcting element driving circuit 8. The aberration correcting lens group 201 corrects spherical aberration while considering the spherical aberration inherent in each of different optical pickups 11. Therefore, a stable focus error signal can be provided in focusing control that is performed on the L1 layer 79 after the correction.

As described above, in an optical disk apparatus of this embodiment, the reference value storage device 16 prestores the quantity of spherical aberration correction (the second quantity) of the aberration correcting lens group 201 obtained when the optical pickup is assembled and adjusted with the optical disk having a reference thickness. Further, the quantity of spherical aberration correction (the first quantity) that corresponds to the type of the disk and the recording plane to be subjected to focusing control is selected. Using the quantity of spherical aberration correction obtained by adding the first and second quantities, the correction of spherical aberration for the recording plane of an optical disk that is subjected to focusing control is performed before operating the focusing control. Thus, a favorable focus error signal can be provided in the subsequent focusing control, so that the effect of operating stable focusing control can be achieved.

There are some cases in which spherical aberration varies with each optical pickup due to adjustment errors during assembly of a lens element and an optical pickup. In this embodiment, the quantity of correction (which differs depending on the optical pickup) required to correct the spherical aberration inherent in the optical pickup has been stored in the reference value storage device 16. Thus, spherical aberration is corrected before operating focusing control while considering the spherical aberration inherent in the optical pickup. This makes it possible to provide a stable focus error signal amplitude in the subsequent focusing control.

This embodiment starts the correction of spherical aberration before operating focusing control. The quantity of spherical aberration correction is predetermined for each recording plane of an optical disk that is subjected to focusing control, among which an appropriate quantity is selected and switched in accordance with the type of the optical disk and the target recording plane.

In the above example, the reference value storage device 16 stores the quantity of spherical aberration correction of the aberration correcting lens group 201 obtained when the optical pickup is assembled and adjusted with one optical disk. However, the present invention is not limited thereto. For example, the reference value storage device 16 may store a plurality of quantities of spherical aberration correction (the second quantity of spherical aberration correction) that are optimized for each type of reference optical disks, such as a two-layer disk and a single-layer disk with different base material thicknesses, and the second quantity of spherical aberration correction corresponding to the result of discrimination by the disk discrimination device 12 can be input to the adder 17.

As the method for discriminating the type of an optical disk with the disk discrimination device 12 in this embodiment, any method can be used as long as it distinguishes the type of an optical disk, e.g., a method in which discrimination is made by detecting a hole formed in a cartridge for housing an optical disk, by the shape of the cartridge, or by using the quantity of light reflected from the optical disk to distinguish between a single-layer disk and a two-layer disk.

Embodiment 8

The following is an explanation of Embodiment 8. Here, the identical elements to those in Embodiments 1 to 7 are denoted by the same reference numerals and the detailed description will be omitted.

Figure 11:
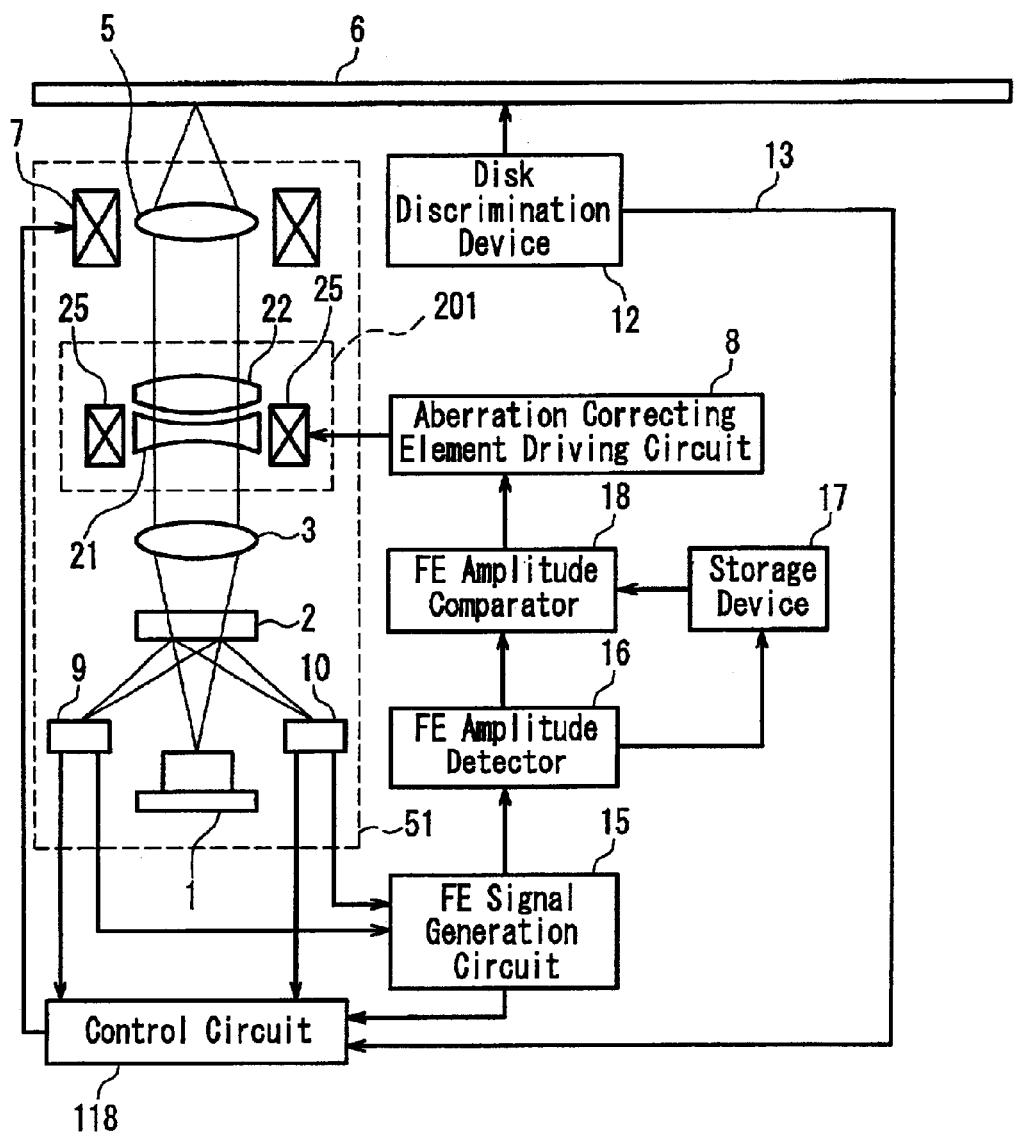
FIG. 11 is a schematic cross-sectional view of an optical disk apparatus according to Embodiment 8 of the present invention.

FIG. 11 shows the configuration of an optical disk apparatus according to Embodiment 8 of the present invention. The optical disk apparatus of this embodiment includes an optical pickup 51, an aberration correcting element driving circuit 8, a control circuit 118, a disk discrimination device 12, an FE signal generation circuit 31, an FE amplitude detector 32, a storage device 34, and an FE amplitude comparator 33. The optical pickup 51 is the same as that in Embodiment 5. The aberration correcting element driving circuit 8 drives an aberration correcting lens group (an aberration correcting system) 201. The control circuit receives a signal from the optical pickup 51 and drives an objective lens 5. The disk discrimination device 12 discriminates the type of an optical disk. The FE signal generation circuit 31 generates a focus error (FE) signal. The FE amplitude detector 32 detects the amplitude of the focus error signal. The storage device 34 stores the focus error signal. The FE amplitude comparator 33 makes a comparison between amplitudes of the focus error signals before and after changing the quantity of spherical aberration correction of the aberration correcting lens group 201.

The aberration correcting lens group 201 includes two lens groups, composed of a positive lens group 22 and a negative lens group 21, and a driving portion 25 for shifting the negative lens group 21 in the optical axis direction.

Next, the procedure for correcting spherical aberration of this embodiment will be described.

First, the disk discrimination device 12 discriminates the type of the optical disk. For example, it determines whether the optical disk installed in the optical disk apparatus is a single-layer disk (FIG. 2A) or a two-layer disk (FIG. 2B). In the case of a multi-layer disk, it determines which recording layer is subjected to focusing control.

The correction of spherical aberration for the optical disk 71 in FIG. 2A will be described as an example. First, the amplitude of a focus error signal output from the FE signal generation circuit 31 (a first amplitude FE0) is measured by the FE amplitude detector 32 and stored in the storage device 34. Then, the quantity of spherical aberration correction of the aberration correcting lens group 201 is changed. The amplitude of a focus error signal output from the FE signal generation circuit 31 after the change (a second amplitude FE1) is measured by the FE amplitude detector 32. The FE amplitude comparator 33 compares the first amplitude FE0 stored in the storage device 34 with the second amplitude FE1. Thereafter, this series of steps is repeated until the amplitude of the focus error signal reaches a maximum. The quantity of spherical aberration correction of the aberration correcting lens group 201 obtained when the amplitude of the focus error signal is maximized is optimum for the recording layer of the first optical disk 71.

In an optical disk apparatus of the present invention, a learning operation for acquiring the optimum quantity of spherical aberration correction for the recording plane of an optical disk that is subjected to focusing control is performed before operating the focusing control. Then, the aberration correcting lens group 201 corrects aberration with the optimum quantity of spherical aberration correction thus obtained, followed by focusing control. Consequently, a favorable focus error signal can be provided in focusing control, so that the effect of operating stable focusing control can be achieved.

The optical disk apparatus of this embodiment starts the correction of spherical aberration before operating focusing control. The learning operation for acquiring the optimum quantity of spherical aberration correction can be performed each time immediately before the focusing control starts. Alternately, e.g., the learning operation for acquiring the optimum quantities of spherical aberration correction for every recording layer can be performed when an optical disk is installed in the optical disk apparatus or the apparatus is turned on, and the obtained quantities that correspond to the respective recording layers may be stored in a memory.

The above example has described the method in which the amplitude of a focus error signal is maximized to acquire the optimum quantity of spherical aberration correction of the aberration correcting lens group 201. However, the present invention is not limited thereto. The same effect can be obtained, e.g., by a method for maximizing the amplitude of a reproduction signal instead of the focus error signal, a method for maximizing the entire quantity of light, or the like.

As the method for discriminating the type of an optical disk with the disk discrimination device 12 in this embodiment, any method can be used as long as it distinguishes the type of an optical disk, e.g., a method in which discrimination is made by detecting a hole formed in a cartridge for housing an optical disk, by the shape of the cartridge, or by using the quantity of light reflected from the optical disk to distinguish between a single-layer disk and a two-layer disk.

Embodiment 9

The following is an explanation of Embodiment 9. Here, the identical elements to those in Embodiments 1 to 8 are denoted by the same reference numerals and the detailed description will be omitted.

Figure 12:
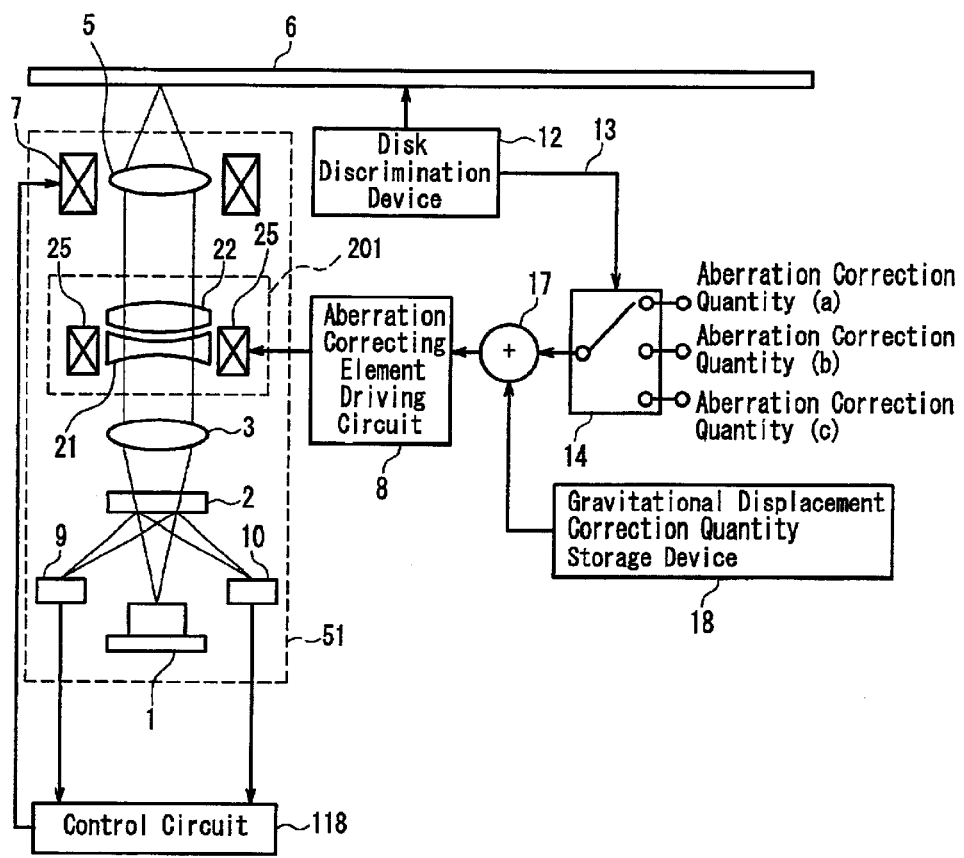
FIG. 12 is a schematic cross-sectional view of an optical disk apparatus according to Embodiment 9 of the present invention.

FIG. 12 shows the configuration of an optical disk apparatus according to Embodiment 9 of the present invention. The optical disk apparatus of this embodiment includes an optical pickup 51, an aberration correcting element driving circuit 8, a control circuit 118, a disk discrimination device 12, an aberration correction quantity switching device 14, a gravitational displacement correction quantity storage device 18, and an adder 17. The optical pickup 51 is the same as that in Embodiment 5. The aberration correcting element driving circuit 8 drives an aberration correcting lens group (an aberration correcting system) 201. The control circuit 118 receives a signal from the optical pickup 51 and drives an objective lens 5. The disk discrimination device 12 discriminates the type of an optical disk. The aberration correction quantity switching device 14 selects and switches the quantity of spherical aberration to be corrected by the aberration correcting lens group 201 (a first quantity of spherical aberration correction) based on a disk discrimination signal 13 output from the disk discrimination device 12. The gravitational displacement correction quantity storage device 18 stores the quantity of correction required to correct a change in the space between a positive lens group 22 and a negative lens group 21, which constitute the aberration correcting lens group 201, due to gravity (i.e., the quantity of gravitational displacement correction, namely, a third quantity of spherical aberration correction). The adder 17 is a circuit for adding the first and third quantities of spherical aberration correction, the first quantity being an output signal from the aberration correction quantity switching device 14 and the third quantity being an output signal from the gravitational displacement correction quantity storage device 18.

The aberration correcting lens group 201 includes two lens groups, composed of the positive lens group 22 and the negative lens group 21, and a driving portion 25 for shifting the negative lens group 21 in the optical axis direction.

The following is an explanation of a configuration in which the optical axis of the aberration correcting lens group 201 is arranged in the vertical direction.

Figure 18A:
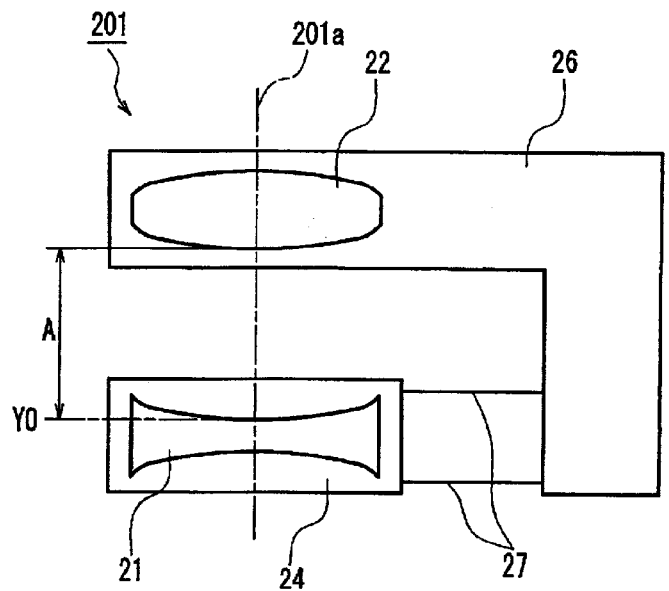
FIGS. 18A and 18B are schematic cross-sectional views of the main portions of an optical pickup used in the embodiments of the present invention and in a conventional example, where an aberration correcting lens group is located with its optical axis horizontal in FIG. 18A and vertical in FIG. 18B.
Figure 18B:
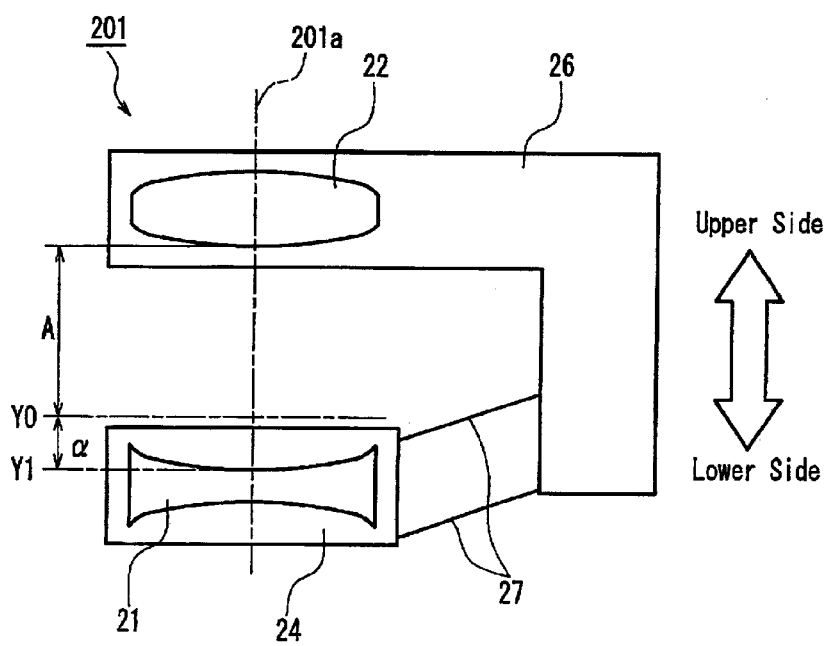

The gravitational displacement correction quantity storage device will be described. As shown in FIG. 18B illustrating a conventional technique, when the aberration correcting lens group including two lens groups is located with its optical axis vertical, the position Y1 of the negative lens group 21 deviates from the designed position Y0 by a distance α (i.e., positional deviation) because of the gravitational displacement of the negative lens group 21 and the lens holder 24. Consequently, spherical aberration is caused by the positional deviation α. In this embodiment, the quantity of correction (the quantity of gravitational displacement correction) required to correct the spherical aberration due to the positional deviation a has been measured, which then is stored in the gravitational displacement correction quantity storage device 18. Therefore, spherical aberration can be corrected by driving the lens holder 24 so that the positional deviation α resulting from the gravitational displacement of the negative lens group 21 is corrected.

Next, the procedure for correcting spherical aberration of this embodiment will be described. The spherical aberration correcting operation can start when, e.g., an optical disk is installed in the optical disk apparatus or the apparatus is turned on. First, the disk discrimination device 12 discriminates the type of the optical disk. When it turns out that the optical disk has a single recording layer (the first optical disk 71), the aberration correction quantity switching device 14 selects the aberration correction quantity (a) according to the instructions of the disk discrimination signal 13. The quantity (a) is used to correct a spherical aberration that corresponds to a base material thickness error of 0 $\mu$m relative to the reference disk. Then, the output signal (i.e., the first quantity of spherical aberration correction) from the aberration correction quantity switching device 14 is input to the adder 17. Moreover, the output signal (i.e., the third quantity of spherical aberration correction) from the gravitational displacement correction quantity storage device 18 also is input to the adder 17. The adder 17 adds the first and third quantities and outputs the result to the aberration correcting element driving circuit 8. The aberration correcting lens group 201 corrects spherical aberration while considering the spherical aberration resulting from a change in the space between its lens groups due to gravity. Therefore, a stable focus error signal can be provided in focusing control that is performed on the recording layer after the correction.

Next, the correction of spherical aberration for a two-layer disk will be described.

When the optical disk having two recording layers (the second optical disk 75) is discriminated by the disk discrimination device 12 and focusing control is performed on the L0 layer 77, the aberration correction quantity switching device 14 selects the aberration correction quantity (b) according to the instructions of the disk discrimination signal 13. The quantity (b) is used to correct a spherical aberration that corresponds to a base material thickness error of 10 $\mu$m by which the base material of the optical disk is thinner than that of the reference disk. Then, the output signal (i.e., the first quantity of spherical aberration correction) from the aberration correction quantity switching device 14 is input to the adder 17. Moreover, the output signal (i.e., the third quantity of spherical aberration correction) from the gravitational displacement correction quantity storage device 18 also is input to the adder 17. The adder 17 adds the first and third quantities and outputs the result to the aberration correcting element driving circuit 8. The aberration correcting lens group 201 corrects spherical aberration while considering the spherical aberration resulting from a change in the space between its lens groups due to gravity. Therefore, a stable focus error signal can be provided in focusing control that is performed on the L0 layer 77 after the correction.

Similarly, when the optical disk having two recording layers (the second optical disk 75) is discriminated by the disk discrimination device 12 and focusing control is performed on the L1 layer 79, the aberration correction quantity switching device 14 selects the aberration correction quantity (c) according to the instructions of the disk discrimination signal 13. The quantity (c) is used to correct a spherical aberration that corresponds to a base material thickness error of 10 $\mu$m by which the base material of the optical disk is thicker than that of the reference disk. Then, the output signal (i.e., the first quantity of spherical aberration correction) from the aberration correction quantity switching device 14 is input to the adder 17. Moreover, the output signal (i.e., the third quantity of spherical aberration correction) from the gravitational displacement correction quantity storage device 18 also is input to the adder 17. The adder 17 adds the first and third quantities and outputs the result to the aberration correcting element driving circuit 8. The aberration correcting lens group 201 corrects spherical aberration while considering the spherical aberration resulting from a change in the space between its lens groups due to gravity. Therefore, a stable focus error signal can be provided in focusing control that is performed on the L1 layer 79 after the correction.

As the gravitational displacement correction quantity storage device 18, any means can be used as long as it stores the third quantity of spherical aberration correction, e.g., a variable resistor, a flash memory or EEPROM, and the same effect can be obtained.

As described above, an optical disk apparatus of this embodiment starts the correction of spherical aberration before operating focusing control. The first quantity of spherical aberration correction is predetermined for each recording plane of an optical disk that is subjected to focusing control, among which an appropriate quantity is selected and switched in accordance with the type of the disk and the target recording plane. The third quantity of spherical aberration correction is set while considering the spherical aberration resulting from a change in the space between the lens groups of the aberration correcting lens group 201 due to gravity. Using the quantity of spherical aberration correction obtained by adding the first and third quantities, the correction of spherical aberration for the recording plane to be subjected to focusing control is performed before operating the focusing control. Thus, a favorable focus error signal can be provided in the subsequent focusing control, so that the effect of operating stable focusing control can be achieved.

In the above configuration, the aberration correcting element driving circuit 8 drives the aberration correcting lens group 201 using the result of addition of the first quantity of spherical aberration correction from the aberration correction quantity switching device 14 and the third quantity of spherical aberration correction from the gravitational displacement correction quantity storage device 18. However, the present invention is not limited thereto. For example, the reference value storage device 16 in Embodiment 7 can be used so that the aberration correcting lens group 201 is driven based on the quantity of spherical aberration that is obtained by adding the second quantity of spherical aberration correction from the reference value storage device 16 to the above result. Alternately, the following configuration also can be employed, in which the disk discrimination device 12 and the aberration correction quantity switching device 14 are removed from the configuration shown in FIG. 12 and the reference value storage device 16 in Embodiment 6 is used instead, so that the aberration correcting lens group 201 is driven based on the result of addition of the second quantity of spherical aberration correction from the reference value storage device 16 and the third quantity of spherical aberration correction from the gravitational displacement correction quantity storage device 18.

As the method for discriminating the type of an optical disk with the disk discrimination device 12 in this embodiment, any method can be used as long as it distinguishes the type of an optical disk, e.g., a method in which discrimination is made by detecting a hole formed in a cartridge for housing an optical disk, by the shape of the cartridge, or by using the quantity of light reflected from the optical disk to distinguish between a single-layer disk and a two-layer disk.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical disk apparatus comprising: an optical pickup comprising a laser source, a focusing optical system for receiving a light beam emitted from the laser source and focusing the light beam on an optical disk to form a tiny spot, a transfer system for transferring the focusing optical system in a direction substantially perpendicular to the optical disk, a photodetector for receiving light reflected from the optical disk and outputting an electric signal in accordance with a quantity of light, and an aberration correcting system for correcting spherical aberration of the focusing optical system; a focusing error detection device for detecting a focused state of the tiny spot on the optical disk based on the output signal from the photodetector; a focusing control device for controlling the focused state of the tiny spot on the optical disk so as to be a predetermined state by driving the transfer system based on an output signal from the focusing error detection device; a disk discrimination device for discriminating a type of the optical disk; and an aberration correction quantity switching device for switching a quantity of spherical aberration correction of the aberration correcting system selectively based on a signal from the disk discrimination device, wherein the aberration correcting system comprises a liquid crystal element, and the quantity of spherical aberration correction of the aberration correcting system is preset based on an output signal from the aberration correction quantity switching device before operating the focusing control device.

2. The optical disk apparatus according to claim 1, wherein the quantity of spherical aberration correction of the aberration correcting system is determined based on a standard thickness of an intermediate layer of a two-layer disk.

3. An optical disk apparatus comprising: an optical pickup comprising a laser source, a focusing optical system for receiving a light beam emitted from the laser source and focusing the light beam on an optical disk to form a tiny spot, a transfer system for transferring the focusing optical system in a direction substantially perpendicular to the optical disk, a photodetector for receiving light reflected from the optical disk and outputting an electric signal in accordance with a quantity of light, and an aberration correcting system for correcting spherical aberration of the focusing optical system; a focusing error detection device for detecting a focused state of the tiny spot on the optical disk based on the output signal from the photodetector; a focusing control device for controlling the focused state of the tiny spot, on the optical disk so as to be a predetermined state by driving the transfer system based on an output signal from the focusing error detection device; and a reference value storage device for storing a quantity of spherical aberration correction of the aberration correcting system obtained when spherical aberration is optimized for an optical disk having a reference thickness, wherein the aberration correcting system comprises a liquid crystal element, and the quantity of spherical aberration correction of the aberration correcting system is preset based on an output signal from the reference value storage device before operating the focusing control device.

4. An optical disk apparatus comprising:

an optical pickup comprising a laser source, a focusing optical system for receiving a light beam emitted from the laser source and focusing the light beam on an optical disk to form a tiny spot, a transfer system for transferring the focusing optical system in a direction substantially perpendicular to the optical disk, a photodetector for receiving light reflected from the optical disk and outputting an electric signal in accordance with a quantity of light, and an aberration correcting system for correcting spherical aberration of the focusing optical system;

a focusing error detection device for detecting a focused state of the tiny spot on the optical disk based on the output signal from the photodetector;

a focusing control device for controlling the focused state of the tiny spot on the optical disk so as to be a predetermined state by driving the transfer system based on an output signal from the focusing error detection device;

a disk discrimination device for discriminating a type of the optical disk;

an aberration correction quantity switching device for switching a first quantity of spherical aberration correction of the aberration correcting system selectively based on a signal from the disk discrimination device;

a reference value storage device for storing a second quantity of spherical aberration correction of the aberration correcting system obtained when spherical aberration is optimized for an optical disk having a reference thickness; and an adder for adding the first and second quantities of spherical aberration correction, wherein the aberration correcting system comprises a liquid crystal element, and a quantity of spherical aberration correction of the aberration correcting system is preset based on an output signal from the adder before operating the focusing control device.

5. An optical disk apparatus comprising:

an optical pickup comprising a laser source, a focusing optical system for receiving a light beam emitted from the laser source and focusing the light beam on an optical disk to form a tiny spot, a transfer system for transferring the focusing optical system in a direction substantially perpendicular to the optical disk, a photodetector for receiving light reflected from the optical disk and outputting an electric signal in accordance with a quantity of light, and an aberration correcting system for correcting spherical aberration of the focusing optical system;

a focusing error detection device for detecting a focused state of the tiny spot on the optical disk based on the output signal from the photodetector; and a focusing control device for controlling the focused state of the tiny spot on the optical disk so as to be a predetermined state by driving the transfer system based on an output signal from the focusing error detection device, wherein the aberration correcting system comprises a liquid crystal element, and a learning operation for spherical aberration correction quantity is performed before operating the focusing control device, the learning operation comprising steps of obtaining a first amplitude of the output signal from the focusing error detection device, storing the first amplitude, obtaining a second amplitude of the output signal from the focusing error detection device after changing a quantity of spherical aberration correction of the aberration correcting system, and comparing the first amplitude with the second amplitude.

6. An optical disk apparatus comprising:

an optical pickup comprising a laser source, a focusing optical system for receiving a light beam emitted from the laser source and focusing the light beam on an optical disk to form a tiny spot, a transfer system for transferring the focusing optical system in a direction substantially perpendicular to the optical disk, a photodetector for receiving light reflected from the optical disk and outputting an electric signal in accordance with a quantity of light, and an aberration correcting system for correcting spherical aberration of the focusing optical system;

a focusing error detection device for detecting a focused state of the tiny spot on the optical disk based on the output signal from the photodetector; and a focusing control device for controlling the focused state of the tiny spot on the optical disk so as to be a predetermined state by driving the transfer system based on an output signal from the focusing error detection device, wherein the aberration correcting system comprises a liquid crystal element, and a learning operation for spherical aberration correction quantity is performed before operating the focusing control device, the learning operation comprising steps of obtaining a first amplitude of a reproduction signal, storing the first amplitude, obtaining a second amplitude of the reproduction signal after changing a quantity of spherical aberration correction of the aberration correcting system, and comparing the first amplitude with the second amplitude.

7. The optical disk apparatus according to claim 5, wherein the learning operation is performed on every recording layer of the optical disk at the time the optical disk is installed in the optical disk apparatus or the time the apparatus is turned on.

8. An optical disk apparatus comprising:

an optical pickup comprising a laser source, a focusing optical system for receiving a light beam emitted from the laser source and focusing the light beam on an optical disk to form a tiny spot, a first transfer system for transferring the focusing optical system in a direction substantially perpendicular to the optical disk, a photodetector for receiving light reflected from the optical disk and outputting an electric signal in accordance with a quantity of light, and an aberration correcting system for correcting spherical aberration of the focusing optical system;

a focusing error detection device for detecting a focused state of the tiny spot on the optical disk based on the output signal from the photodetector;

a focusing control device for controlling the focused state of the tiny spot on the optical disk so as to be a predetermined state by driving the first transfer system based on an output signal from the focusing error detection device;

a disk discrimination device for discriminating a type of the optical disk; and an aberration correction quantity switching device for switching a quantity of spherical aberration correction of the aberration correcting system selectively based on a signal from the disk discrimination device, wherein the aberration correcting system comprises a first lens group and a second lens group that are arranged between the laser source and the focusing optical system, and a second transfer system for changing a space between the first and second lens groups by shifting one of the first and second lens groups in an optical axis direction, and the quantity of spherical aberration correction of the aberration correcting system is preset based on an output signal from the aberration correction quantity switching device before operating the focusing control device.

9. The optical disk apparatus according to claim 8, wherein the quantity of spherical aberration correction of the aberration correcting system is determined based on a standard thickness of an intermediate layer of a two-layer disk.

10. An optical disk apparatus comprising:

an optical pickup comprising a laser source, a focusing optical system for receiving a light beam emitted from the laser source and focusing the light beam on an optical disk to form a tiny spot, a first transfer system for transferring the focusing optical system in a direction substantially perpendicular to the optical disk, a photodetector for receiving light reflected from the optical disk and outputting an electric signal in accordance with a quantity of light, and an aberration correcting system for correcting spherical aberration of the focusing optical system;

a focusing error detection device for detecting a focused state of the tiny spot on the optical disk based on the output signal from the photodetector;

a focusing control device for controlling the focused state of the tiny spot on the optical disk so as to be a predetermined state by driving the first transfer system based on an output signal from the focusing error detection device; and a reference value storage device for storing a quantity of spherical aberration correction of the aberration correcting system obtained when spherical aberration is optimized for an optical disk having a reference thickness, wherein the aberration correcting system comprises a first lens group and a second lens group that are arranged between the laser source and the focusing optical system, and a second transfer system for changing a space between the first and second lens groups by shifting one of the first and second lens groups in an optical axis direction, and the quantity of spherical aberration correction of the aberration correcting system is preset based on an output signal from the reference value storage device before operating the focusing control device.

11. An optical disk apparatus comprising:

an optical pickup comprising a laser source, a focusing optical system for receiving a light beam emitted from the laser source and focusing the light beam on an optical disk to form a tiny spot, a first transfer system for transferring the focusing optical system in a direction substantially perpendicular to the optical disk, a photodetector for receiving light reflected from the optical disk and outputting an electric signal in accordance with a quantity of light, and an aberration correcting system for correcting spherical aberration of the focusing optical system;

a focusing error detection device for detecting a focused state of the tiny spot on the optical disk based on the output signal from the photodetector;

a focusing control device for controlling the focused state of the tiny spot on the optical disk so as to be a predetermined state by driving the first transfer system based on an output signal from the focusing error detection device;

a disk discrimination device for discriminating a type of the optical disk;

an aberration correction quantity switching device for switching a first quantity of spherical aberration correction of the aberration correcting system selectively based on a signal from the disk discrimination device;

a reference value storage device for storing a second quantity of spherical aberration correction of the aberration correcting system obtained when spherical aberration is optimized for an optical disk having a reference thickness; and an adder for adding the first and second quantities of spherical aberration correction, wherein the aberration correcting system comprises a first lens group and a second lens group that are arranged between the laser source and the focusing optical system, and a second transfer system for changing a space between the first and second lens groups by shifting one of the first and second lens groups in an optical axis direction, and a quantity of spherical aberration correction of the aberration correcting system is preset based on an output signal from the adder before operating the focusing control device.

12. The optical disk apparatus according to claim 8, further comprising a device for storing a quantity of gravitational displacement correction used to correct the space between the first and second lens groups.

13. An optical disk apparatus comprising:

an optical pickup comprising a laser source, a focusing optical system for receiving a light beam emitted from the laser source and focusing the light beam on an optical disk to form a tiny spot, a first transfer system for transferring the focusing optical system in a direction substantially perpendicular to the optical disk, a photodetector for receiving light reflected from the optical disk and outputting an electric signal in accordance with a quantity of light, and an aberration correcting system for correcting spherical aberration of the focusing optical system;

a focusing error detection device for detecting a focused state of the tiny spot on the optical disk based on the output signal from the photodetector; and a focusing control device for controlling the focused state of the tiny spot on the optical disk so as to be a predetermined state by driving the first transfer system based on an output signal from the focusing error detection device, wherein the aberration correcting system comprises a first lens group and a second lens group that are arranged between the laser source and the focusing optical system, and a second transfer system for changing a space between the first and second lens groups by shifting one of the first and second lens groups in an optical axis direction, and a learning operation for spherical aberration correction quantity is performed before operating the focusing control device, the learning operation comprising steps of obtaining a first amplitude of the output signal from the focusing error detection device, storing the first amplitude, obtaining a second amplitude of the output signal from the focusing error detection device after changing a quantity of spherical aberration correction of the aberration correcting system, and comparing the first amplitude with the second amplitude.

14. An optical disk apparatus comprising:

an optical pickup comprising a laser source, a focusing optical system for receiving a light beam emitted from the laser source and focusing the light beam on an optical disk to form a tiny spot, a first transfer system for transferring the focusing optical system in a direction substantially perpendicular to the optical disk, a photodetector for receiving light reflected from the optical disk and outputting an electric signal in accordance with a quantity of light, and an aberration correcting system for correcting spherical aberration of the focusing optical system;

a focusing error detection device for detecting a focused state of the tiny spot on the optical disk based on the output signal from the photodetector; and a focusing control device for controlling the focused state of the tiny spot on the optical disk so as to be a predetermined state by driving the first transfer system based on an output signal from the focusing error detection device, wherein the aberration correcting system comprises a first lens group and a second lens group that are arranged between the laser source and the focusing optical system, and a second transfer system for changing a space between the first and second lens groups by shifting one of the first and second lens groups in an optical axis direction, and a learning operation for spherical aberration correction quantity is performed before operating the focusing control device, the learning operation comprising steps of obtaining a first amplitude of a reproduction signal, storing the first amplitude, obtaining a second amplitude of the reproduction signal after changing a quantity of spherical aberration correction of the aberration correcting system, and comparing the first amplitude with the second amplitude.

15. The optical disk apparatus according to claim 13, wherein the learning operation is performed on every recording layer of the optical disk at the time the optical disk is installed in the optical disk apparatus or the time the apparatus is turned on.

16. The optical disk apparatus according to claim 8, wherein the first transfer system and the aberration correcting system are located at different positions on the optical pickup.

17. The optical disk apparatus according to claim 6, wherein the learning operation is performed on every recording layer of the optical disk at the time the optical disk is installed in the optical disk apparatus or the time the apparatus is turned on.

18. The optical disk apparatus according to claim 10, further comprising a device for storing a quantity of gravitational displacement correction used to correct the space between the first and second lens groups.

19. The optical disk apparatus according to claim 11, further comprising a device for storing a quantity of gravitational displacement correction used to correct the space between the first and second lens groups.

20. The optical disk apparatus according to claim 14, wherein the learning operation is performed on every recording layer of the optical disk at the time the optical disk is installed in the optical disk apparatus or the time the apparatus is turned on.

21. The optical disk apparatus according to claim 10, wherein the first transfer system and the aberration correcting system are located at different positions on the optical pickup.

22. The optical disk apparatus according to claim 11, wherein the first transfer system and the aberration correcting system are located at different positions on the optical pickup.

23. The optical disk apparatus according to claim 13, wherein the first transfer system and the aberration correcting system are located at different positions on the optical pickup.

24. The optical disk apparatus according to claim 14, wherein the first transfer system and the aberration correcting system are located at different positions on the optical pickup.

* * * * *

UNITED STATES PATENT AND TRADEMARK OFFICE
CERTIFICATE OF CORRECTION

PATENT NO.     : 6,934,226 B2
DATED          : August 23, 2005
INVENTOR(S)    : Yasuda et al.

It is certified that error appears in the above-identified patent and that said Letters Patent is hereby corrected as shown below:

Column 5,
Line 5, "the tiny spot, on the optical" should read -- the tiny spot on the optical --.

Signed and Sealed this

Fourteenth Day of March, 2006

JON W. DUDAS
*Director of the United States Patent and Trademark Office*